United States Patent [19]
Katsurahira

[11] Patent Number: 5,898,136
[45] Date of Patent: Apr. 27, 1999

[54] POSITION DETECTING APPARATUS HAVING A TABLET AND A POSITION POINTING DEVICE

[75] Inventor: Yuji Katsurahira, Saitama-ken, Japan

[73] Assignee: Wacom Co., Ltd., Saitama-ken, Japan

[21] Appl. No.: 08/712,052

[22] Filed: Sep. 10, 1996

[51] Int. Cl.⁶ .............................. G08C 21/00; G09G 5/00
[52] U.S. Cl. ..................... 178/18.01; 178/18.03; 178/18.06; 178/19.01; 178/19.03; 345/173; 345/176; 345/179
[58] Field of Search ..................................... 345/173, 174, 345/179, 176; 178/18.01, 18.03, 18.06, 19.01, 19.03

[56] References Cited

U.S. PATENT DOCUMENTS

| | | | |
|---|---|---|---|
| 4,878,553 | 11/1989 | Yamanami | 178/18.05 |
| 5,028,745 | 7/1991 | Yamanami et al. | 178/19.03 |
| 5,500,492 | 3/1996 | Kobayashi | 178/18.04 |
| 5,629,500 | 5/1997 | Fukuzaki | 178/19.04 |
| 5,706,000 | 1/1998 | Fukuzaki | 341/5 |

Primary Examiner—Vijay Shankar
Attorney, Agent, or Firm—Finnegan, Henderson, Farabow, Garrett & Dunner, L.L.P.

[57] ABSTRACT

A position detecting apparatus includes a position point device and a tablet. The position pointing device has a simple configuration as well as an easy way of adjusting a resonance frequency, without requiring a wide range of frequencies for inputting information. The position pointing device has a resonance circuit and an amplitude control circuit that limits a signal level generated in the resonance circuit. The tablet transmits an electromagnetic wave with at least two kinds of energy per transmission, thereby identifying operation of the position pointing device based on a comparison of signal levels received by the tablet.

15 Claims, 21 Drawing Sheets

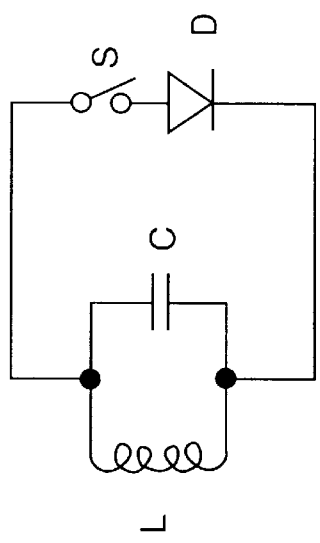
FIG. 2
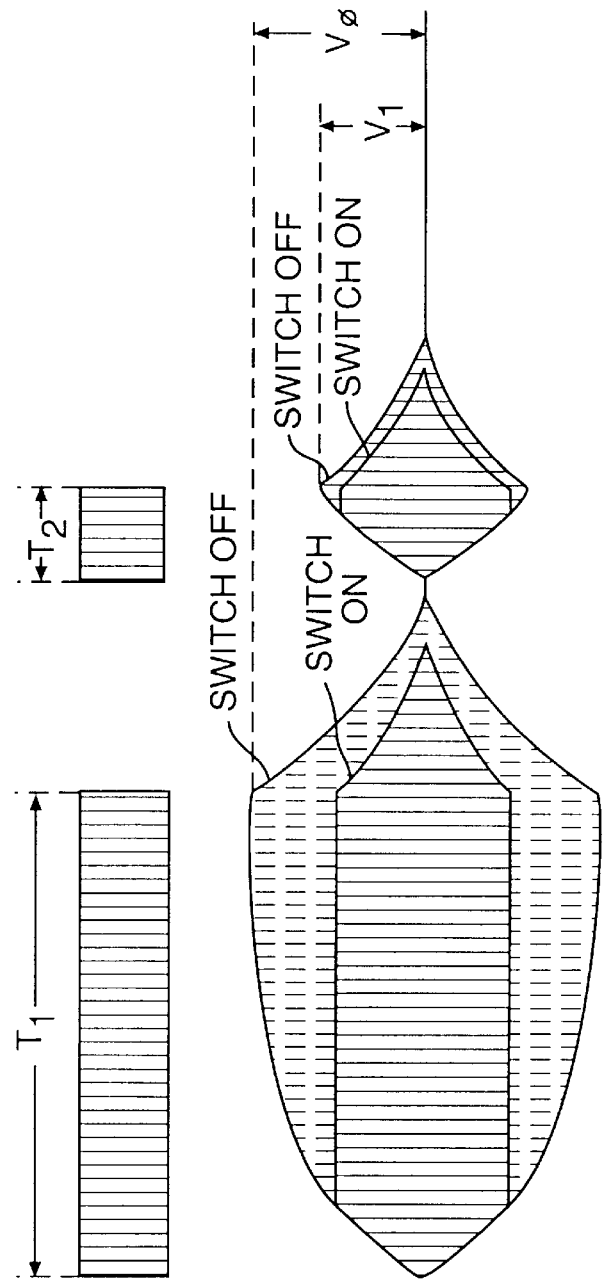
FIG. 3a
FIG. 3b

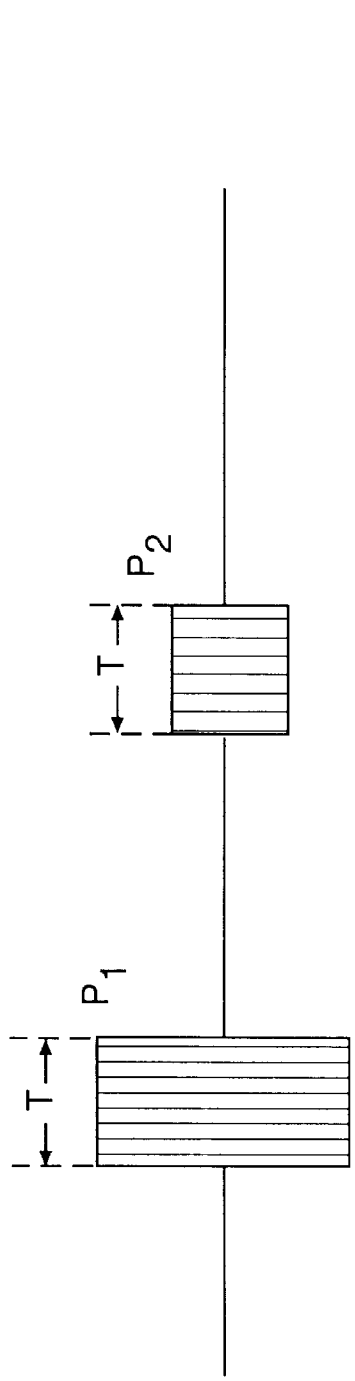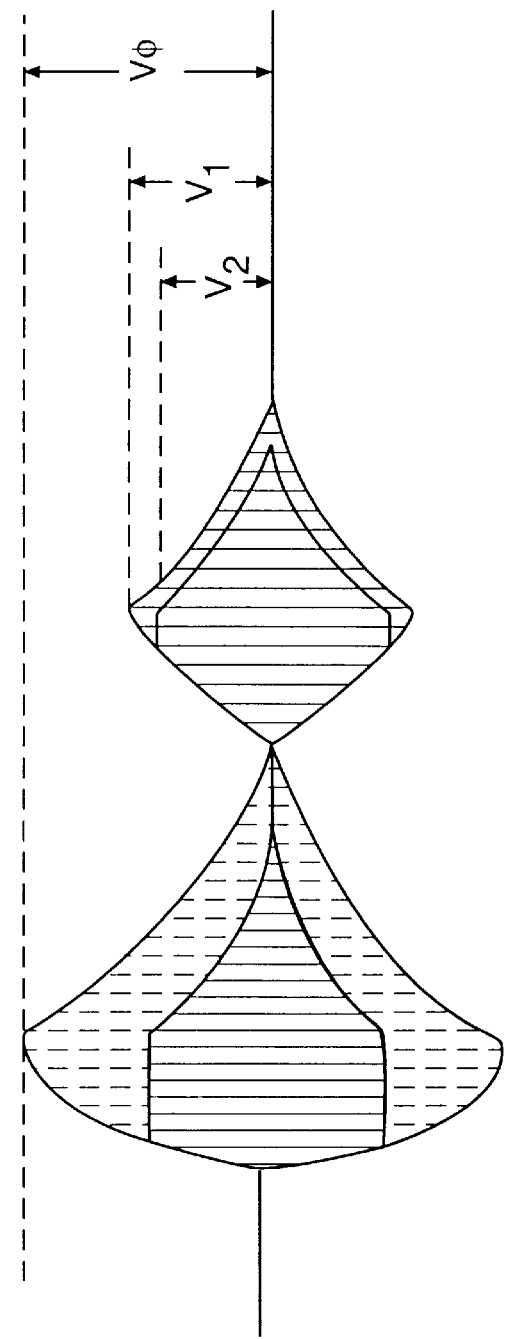
FIG. 4a
FIG. 4b

POSITION DETECTING APPARATUS HAVING A TABLET AND A POSITION POINTING DEVICE

BACKGROUND OF THE INVENTION

1. Field of the Invention

The present invention relates generally to position detecting apparatus and a position pointing device which can be used therewith, by making use of electromagnetic waves.

2. Description of the Related Art

The applicant's assingnee has proposed, in European Patent Publication No. 0259894, a position detecting apparatus which transmits and receives an electromagnetic wave between a sensor unit of a position detection section (here referred to as a tablet) and a position pointing device to obtain a coordinate value of a position on the tablet pointed to by the position pointing device. European Patent Publication No. 0259894 is hereby incorporated by reference. European Patent Publication No. 0259894 is a related case of U.S. Pat. No. 4,878,553. U.S. Pat. No. 5,028,745 issued from a Divisional application of U.S. Pat. No. 4,878,553.

This apparatus is equipped with a plurality of loop coils placed within the tablet and arranged in parallel to each other along a position detecting direction. The plurality of loop coils are selected in turn to transmit an electromagnetic wave to a resonance circuit in the pointer and to receive an electromagnetic wave re-transmitted from a resonance circuit. The loop coil which develops the strongest reception signal enables the coordinate position of the position pointing device to be determined.

The position detecting apparatus of the type described faces a demand for ability to enter various kinds of additional information in addition to the coordinate values of the pointed position, such as information which indicates that the pointing means (such as a pen) has been set to a position for pointing a definite position (this state will be referred to as a 'pen-down' state, hereinafter), information concerning the type of the pointing means, e.g., a pen, a cursor, or the like, as well as a demand for inputting, together with the coordinate values, information for continuously varying values of parameters other than the width of a line and hue or density (brightness) of the position or area appointed by the pointing device.

To cope with such demands, the position pointing device disclosed in Japanese Patent Laid-Open No. 63-70326 employs a manual switch which selectively connects an additional capacitor so as slightly to vary the resonance frequency. The slight variation in the resonance frequency is detected as a variation in the phase angle so as to be used as information indicative of the pen-down state or the type of pointing means.

However, the detectable range of the phase angle in the apparatus of the prior application is limited to from about −60 to about +60 degrees. Furthermore, a certain tolerance for the phase angle to be detected has to be set in order to accommodate any change in the inductance of the coil and capacitance of the capacitor of the resonance circuit caused by a change in the ambient temperature. For these reasons, the number of categories of information that can be entered is undesirably limited. Especially, in case of allowing the continuous variation in resonance frequency corresponding to the pen pressure, no information other than the pen pressure could be inputted.

The same applicant also proposed in Japanese Patent Application No. 63-308712 (Japanese Patent Laid-Open No. 2-155019), an input device which can input plural pen pressure, or a combination of pen pressure information and other information by using a position pointing device equipped with a resonance circuit which is changeable to plural realms of predetermined frequencies corresponding to the ON/OFF state of a side switch while enabling to change the resonant frequency continuously in accordance with the pen pressure.

In the aforesaid apparatus of the prior application a realm of phase angle in relation to the fixed frequency was assigned to divided frequency realm responding to the ON/OFF state of the side switch, so that the range for detecting pen pressure became small, as well as needing two different sets of correction indexes due to the differences in the phase angle for the pen pressure whether the switch is ON or OFF.

Furthermore, the applicants in Japanese Patent Laid Open No. 5-233126 and Japanese Patent Laid-Open No. 2-155019, proposed an apparatus wherein the center of a resonance frequency varies to one predetermined frequency in accordance with the switch operation, making use of a position pointing device having a resonance circuit resonance frequency changes continuously centered on one of at least two said plural frequencies corresponding to pen pressure, transmitting plural frequency electromagnetic waves toward said position pointing device, then receiving an electromagnetic wave retransmitted from the resonance circuit, to detect the coordinate value of the pointed position and the phase angle, enabling plural pen pressure or pen pressure information and other information to be input by identifying the resonance frequency to one of said plural predetermined frequencies, and enabling pen pressure information toward the phase angle to be corrected without reducing range pen pressure detection range.

The aforementioned application, however, had a problem of needing adjustments for each of the plural resonance frequencies as well as needing a wide range of frequencies in order to avoid overlapping when pen pressure changes.

SUMMARY OF THE INVENTION

An object of the present invention is to provide a position detecting apparatus and a position pointing device which do not require precise adjustment of resonance frequency and which enable the input of simple information such as pen down information without requiring hardware to detect the phase angle variation.

Another object of the present invention is to provide a position detecting apparatus and a position pointing device, wherein the configuration of the position pointing device, as well as an adjustment of resonance frequency are simple, enabling the input of information, especially pen pressure information, without requiring a wide range of frequencies.

Additional advantages and purposes of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the invention comprises a position detecting apparatus comprising a position pointing device and a tablet. The position pointing device comprises a resonance circuit comprising at least a coil and a capacitor, and an amplitude control circuit for adjustability limiting the maximum amplitude of a signal generated by said resonance circuit. The tablet comprises an electromagnetic transmission means for transmitting at least two kinds of energy as electromagnetic waves during one transmission; an electromagnetic reception means for receiving an electromagnetic wave reflected from said resonance circuit in response to the electromagnetic wave from said electromagnetic transmission means; and an operation information identification means for identifying an operation by comparing the electromagnetic waves received by said electromagnetic wave reception means as a result of said kinds of energy in relation to the maximum amplitude.

According to another aspect of the invention a position pointing device comprises a resonance circuit including a coil and a capacitor; an amplitude control circuit for limiting a maximum amplitude of a signal generated by said resonance circuit; and a maximum amplitude setting means for setting said maximum amplitude.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings:

FIG. 2 is a diagram of a configuration of a position pointing device;

FIGS. 3a and 3b show waveforms for FIG. 2 when a transmission duration is changed;

FIGS. 4a and 4b show waveforms for FIG. 2 when a transmission power is changed;

DESCRIPTION OF THE PREFERRED EMBODIMENT

Reference will now be made in detail to the present preferred embodiments of the invention, examples of which are illustrated in the accompanying drawings.

Figure 1:
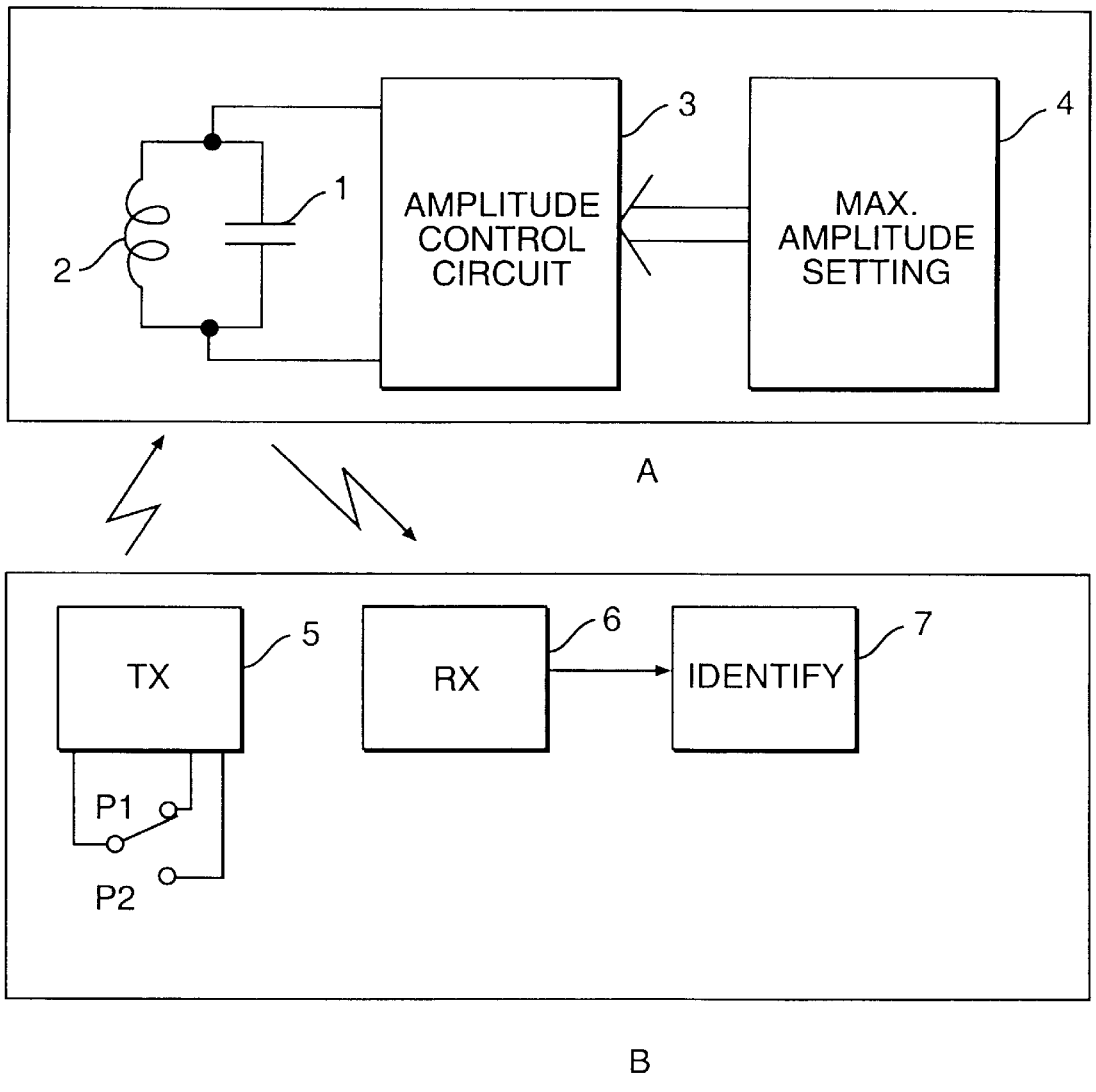
FIG. 1 is a diagram of a position detecting apparatus.

FIG. 1 shows a position detecting apparatus in accordance with the present invention. The position detecting apparatus includes a position pointing device A, for example, a pen or a stylus, and a tablet B also known as a detector or pad. The tablet B generates an electromagnetic wave that is reflected off of the position pointing device A and then sensed by the tablet B. Capacitor 1 and coil 2 comprise a resonance circuit of the position pointing device A. The resonance circuit resonates with a frequency of the electromagnetic wave of the tablet.

In FIG. 1, an electromagnetic transmitter 5 transmits an electromagnetic wave with energy values (P1 and P2) during one transmission. The electromagnetic wave receiver 6 receives electromagnetic waves transmitted from the electromagnetic transmitter 5 and reflected from the resonance circuit within the position pointing device A. The electromagnetic wave receiver 6 detects the reflected electromagnetic waves. The position pointing device A is also equipped with an amplitude control circuit 3 which limits the level of generated signals in the resonance circuit and a maximum amplitude circuit 4 for setting the level of the signal.

As explained below, the tablet side can detect the operation of the maximum amplitude circuit 4 in the position pointing device. First, if the signal level within the position pointing device is set to a sufficiently low value VL even if the energy of the electromagnetic wave generated by the electromagnetic transmitter 5 is low, then the signal level generated within the position pointing device sufficiently reaches the set level. Therefore, the signals detected by the electromagnetic receiver 6 when electromagnetic waves are generated from the tablet with two kinds of energy values become the same level.

Next, if the signal level is set to a sufficiently high value VH within the position pointing device, then the signal level generated within the position pointing device does not reach the set level when the energy value of the electromagnetic wave generated by the transmitter 5 is low. The signal level generated within the position pointing device reaches the set level, however, when the energy value of the generated electromagnetic wave is high. Therefore, the received signal level detected by the electromagnetic receiver 6 when the electromagnetic wave is generated from the tablet with a high energy value becomes sufficiently high compared to the received signal level detected by the electromagnetic receiver 6 when the electromagnetic wave is generated from the tablet with a low energy value.

Next, if the signal level is set for a middle value VM within the position pointing device, in like manner, the signal level generated within the position pointing device does not reach the set level when the energy value of the electromagnetic wave generated by the transmitter 5 is low, but the signal level generated within the position pointing device reaches the set level when the energy value of the generated electromagnetic wave is high. Therefore, the received signal level detected by the electromagnetic receiver 6 when the electromagnetic wave is generated from the tablet with a high energy value becomes sufficiently high compared to the received signal level detected by the electromagnetic receiver 6 when the electromagnetic wave is generated from the tablet with a low energy value, but the difference of detected levels is smaller compared to that of setting the level to VH. Therefore, by comparing the received signals detected by tablet side when electromagnetic waves are generated with two kinds of energy values, setting conditions in the position pointing device can be identified.

Figure 5:
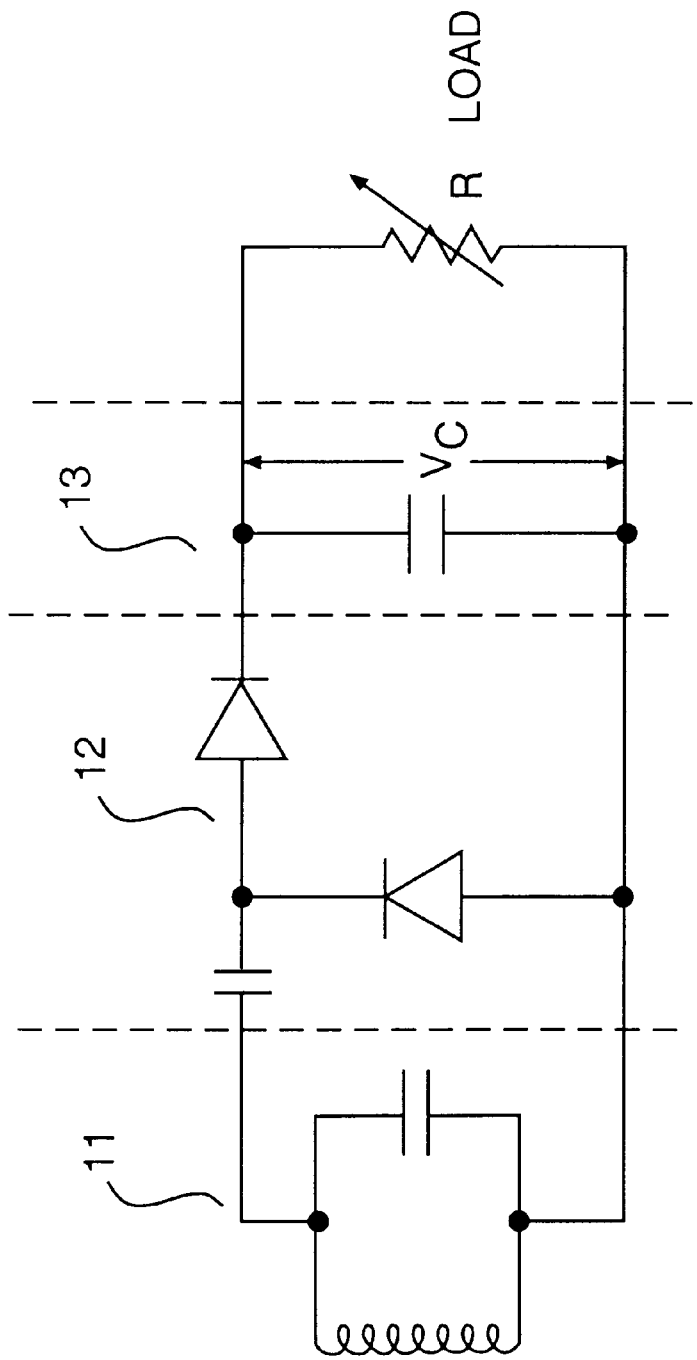
FIG. 5 is a diagram of a second basic configuration of a position pointing device.

FIG. 2 shows a resonance circuit 11 having an output circuit comprising a switch S and a diode D in series. FIG. 5 shows a resonance circuit 11 having an output circuit connected to a rectifier 12. The output of the rectifier is connected to a capacitor and a load resistor in parallel. The rectifier 12 comprises a T-arrangement, the stem of the T being a diode, and the two arms of the crosspiece of the T respectively comprising a capacitor at the side to be connected to the resonance circuit and a diode. The two diodes of the rectifier are connected in cascade.

The resonance circuits of FIG. 2 and 5 are additional embodiments of the resonance circuit of FIG. 1. We shall consider now the effect of electromagnetic wave transmission from the tablet of FIG. 1 to the resonance circuit for short and long periods with constant amplitude and with different amplitudes for the same time.

The waveform in FIG. 3b shows the response of the resonance circuit to the transmission of constant amplitude electromagnetic waves as shown in FIG. 3a for a period of time T1, followed by a pause at zero amplitude and then a further burst at the same amplitude for a shorter time T2. The amplitude of the voltage induced in the resonance circuit increases exponentially to reach a saturation value towards the end of the period expiring at T1. After the transmission of waves has ceased, the voltage induced in the resonance circuit decreases exponentially to zero. After the decay to zero, the further burst of constant amplitude electromagnetic waves is transmitted for the shorter period T2, during which the resonance circuit does not reach saturation. At the end of the time T2, the induced voltage in the resonance circuit again decreases exponentially to zero. These are the circumstances when the switch S in FIG. 2 is open. When the switch S in FIG. 2 is closed, the diode will conduct when the induced voltage reaches a value lower than the saturation value, and this has the effect of limiting the voltage induced in the resonance circuit to the inner envelope of the waveform of FIG. 3b. If the conducting voltage of the diode and the time T2 are suitably related, it can be arranged that the inner envelope of waveform of 3b reaches its maximum value shortly before the end of the time T2 and then decays exponentially once more to zero after time T2. The switch S acts to control the maximum amplitude of the voltage induced in the resonance circuit.

The level of electromagnetic waves retransmitted from the resonance circuit to the electromagnetic wave receiver of the tablet depends on the voltage induced in the resonance circuit. When the switch is off, it will be seen that the maximum value of the outer envelope in waveform 3b is much greater towards the end of time T1 than towards the end of time T2. On the other hand, when the switch is on, the maximum value of the inner envelope of waveform 3b is the same towards the end of the time T1 as towards the end of the time T2. By comparing the maximum levels of electromagnetic waves received from the resonance circuit during the times T1 and T2, it is possible to determine whether the switch is on or off. If the two maximum levels are the same, the switch is on. If the level towards the end of the time T1 is greater than that towards the end of the time T2, the switch is off.

The waveforms of FIG. 4 enable one to make similar determinations for electromagnetic wave transmissions to the resonance circuit for equal periods of time but at different amplitude levels. Considering first the case when the switch S is open, the induced voltage in the resonance circuit will rise exponentially towards a saturation voltage of waves and will decay exponentially to zero, as shown in the outer envelope of waveform 4b. During the subsequent burst of smaller amplitude electromagnetic waves, which occurs after the first induced voltage has decayed to zero, the induced voltage in the resonance circuit will again increase exponentially, and reach a voltage Vphi at the end of the burst but at a lower rate due to the lower amplitude of the transmitted waves and will only reach a voltage V1 at the end of the burst, thereafter decaying exponentially to zero.

The inner envelopes in waveform 4b show the situation when the switch S is closed. With this arrangement, the voltage induced in the resonance circuit increases exponentially as before but is limited when it reaches the conducting voltage of the diode. Once again, the conducting voltage of the diode and the period of the burst of radiation are related so that the induced voltage in the resonance circuit has just reached the conducting voltage of the diode shortly before the end of the period of the burst of radiation. During each of the bursts of radiation, the induced voltage in the resonance circuit is limited to the voltage V2 when the switch is closed. When the switch is open, the induced voltage is Vphi during the burst of large amplitude radiation, and V1 during the burst of low amplitude radiation. It is therefore possible to determine whether the switch is open by comparing the level of radiation received from the resonance circuit during the two bursts. If the induced voltage is larger during the large amplitude burst than during the small amplitude bursts, the switch is open. If the voltages are the same towards the end of the bursts, the switch is closed.

In FIG. 5, the switch and diode are replaced by the rectifier circuit and capacitor and load resistance. When the resistance is high, the time constant of the output circuit connected to the resonance circuit is much longer than the time taken for the induced voltage in the resonance circuit to decay under normal circumstances. When the load resistance is low, the time constant can be of equal or shorter duration than the time taken for the resonance circuit induced voltage to decay to zero in normal circumstances. In the circumstances discussed above with reference to FIG. 2, the induced voltage in the resonance circuit decays to zero between the two bursts of radiation received. With the output circuit of FIG. 5 connected to the resonance circuit, a high load resistance in the output circuit as shown in FIG. 5 will maintain the voltage induced in the resonance circuit for a much longer period. Thus, when the second burst of radiation is received, the induced voltage will not rise exponentially from zero, but from a level not substantially smaller than the level reached at the end of the previous burst of radiation. On the other hand, when the load resistance is small, the time constant of the output circuit has little effect on the decay of the induced voltage in the resonance circuit, and at the start of the second burst, the induced voltage will rise exponentially from zero or a very low value.

Considering first the two bursts of radiation shown in FIG. 3a, of equal amplitude but of different times, when a high load resistance is present, the induced voltage will not decay to zero between the two bursts of radiation so that instead of only reaching an amplitude of about V1 during the second burst of radiation as shown in waveform FIG. 3b, the induced voltage in the resonance circuit will very quickly rise to saturation value during the second burst of radiation. On the other hand, if the time constant is short, then the induced voltage will have decayed substantially to zero between the bursts of radiation and the waveform of the induced voltage during the second burst will be very similar to that shown in FIG. 3b, and at the end of time T2, the induced voltage will only have reached a value in the region of voltage V1.

By comparing the level of electromagnetic radiation received from the resonance circuit during the long and short bursts of radiation of equal amplitude, it can be determined whether the load resistance is high (if they are equal) or low (if the level of the received radiation is much lower during time T2). Similar considerations apply when the two bursts of radiation are of equal duration but of different amplitude in connection with an output circuit containing the load resistance, as has been discussed above in relation to the output circuit containing a switch.

As would be expected, the arrangement when the load resistance is high corresponds to that when the switch is off, since a switch which is off corresponds to a high resistance.

Figure 6:
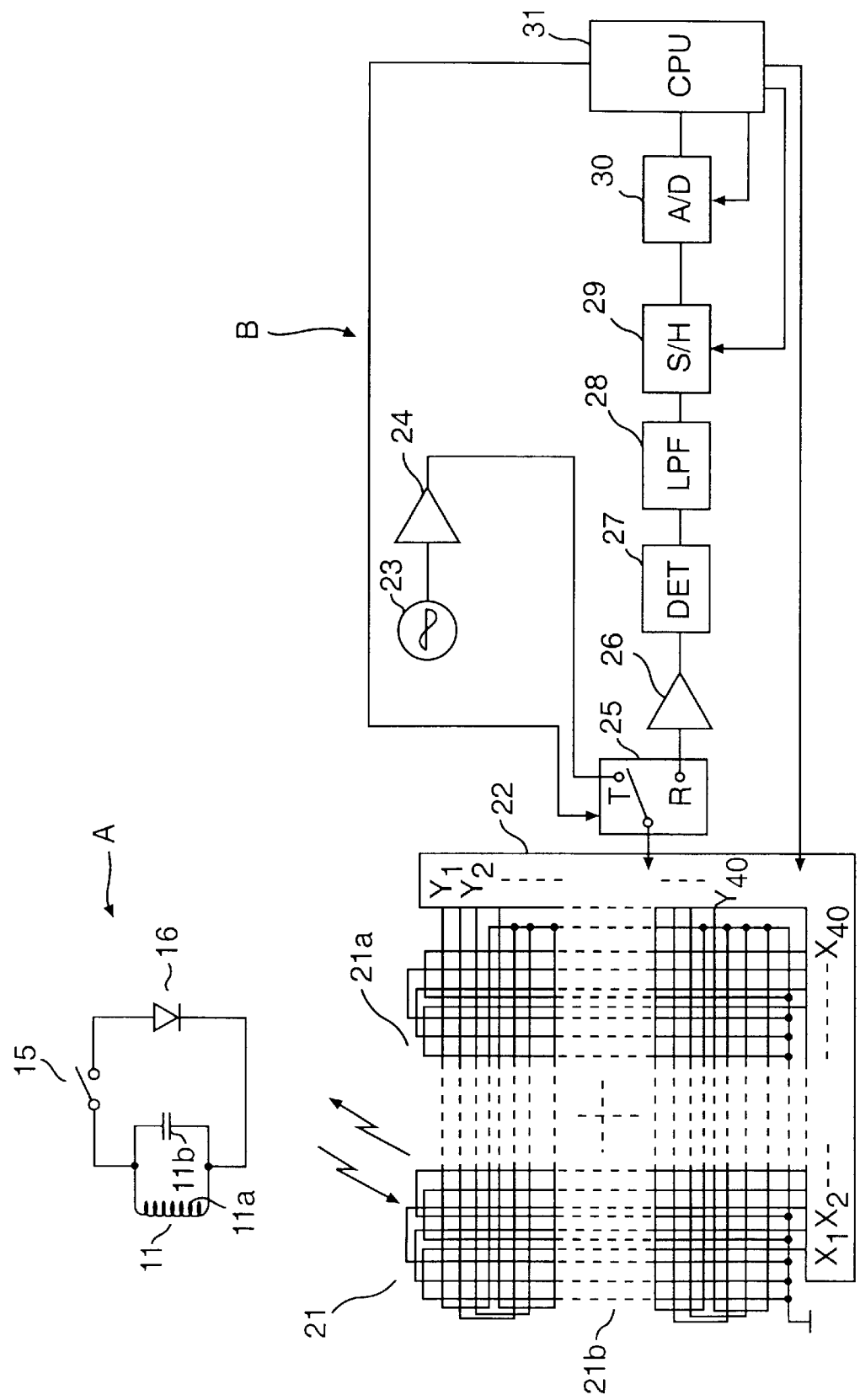
FIG. 6 is a diagram of a first embodiment of the position detecting apparatus and the position pointing device.

FIG. 6 illustrates a first embodiment of the present invention. Position pointing device A includes a coil 11a, capacitor 11b, a switch 15, and a diode 16. Tablet B includes loop coils group juxtaposed in the X-axial direction 21a, loop coils group Juxtaposed in the Y-axial direction 21b, a selection circuit 22, an oscillator 23, a current driver 24, a switching connection circuit 25, a receiving amplifier 26, a wave detector 27, low-pass filters (LPF) 28, sample holding circuits (S/H) 29, analog-digital (A/D) converting circuits 30, and a central processing unit (CPU) 31.

The coil 11a and the capacitor 11b are connected in a loop, forming a resonance circuit 11 having a fixed frequency f0. The output circuit of the resonance circuit comprises a diode 16 and a switch 15 in series. The orientation of diode 16 can be opposite to that shown in FIG. 6.

The X-axial loop coil group 21a is composed of plural loop coils, in this example 40 loop coils, which are arranged nearly parallel to each other along the X-axis, one side thereof being connected to the selector circuit 22, while the other side is grounded in common. The Y-axial loop coil group 21b is composed of plural loop coils, in this example 40 loop coils, which are arranged nearly parallel to each other along the Y axis, one side thereof being connected to the selector circuit 22, while the other side is grounded in common. The two groups of X-axial loop coils and Y-axial loop coils form a sensor unit 21.

The selection circuit 22 selects one loop coil from the X-axial loop coil group and/or the Y-axial loop coil group in accordance with specified selection signals from the processing device 31.

The oscillator 23 supplies alternating current (AC) signals with the frequency f0 to the current driver 24. The current driver 24 converts the alternating current signals to electromagnetic current and sends it out to the switching connection circuit 25. The switching connection circuit 25 connects those loop coils selected by said selector circuit 22 to both the current driver 24 and the receiving amplifier 26 in accordance with the switching signals generated by the processing device 31. The receiving amplifier 26 amplifies induced voltages transmitted via the selector circuit 22 and the switching connection circuit 25, and sends them out to the wave detector 27.

The wave detector 27 detects the induced voltages generated in the selected loop coil and sends them out to the low pass filter 28. The low pass filter 28 possesses a cut-off frequency sufficiently lower than the frequency f0, and converts the output signal of the wave detector 27 to a direct current signal, and sends it out to the S/H circuit 29. The S/H circuit 29 conserves the voltage value of the output signal at established timings, more specifically at established timings during the receiving period, and sends it out to the A/D converting circuit 30. The A/D circuit 30 converts the output signal of the S/H circuit 29 from analog to digital and sends it out to the processing device 31.

The processing device 31 controls various portions of tablet B and computers a coordinate value of the pointed position of position pointing device A in both the X-axial direction and the Y-axial direction based on the voltage level of the induced voltage attained from the loop coils in both the X-axial loop coil group 21a and the Y-axial loop coil group 21b when electromagnetic waves are transmitted for a fixed transmitting duration. The processing device 31 further identifies whether the switch 15 in the position pointing device switch A is ON or not based on the change in voltage level of the induced voltage attained from a loop coil in each of the X-axial loop coil group 21a and the Y-axial loop coil group 21b when electromagnetic waves are transmitted for different durations.

Figure 7:
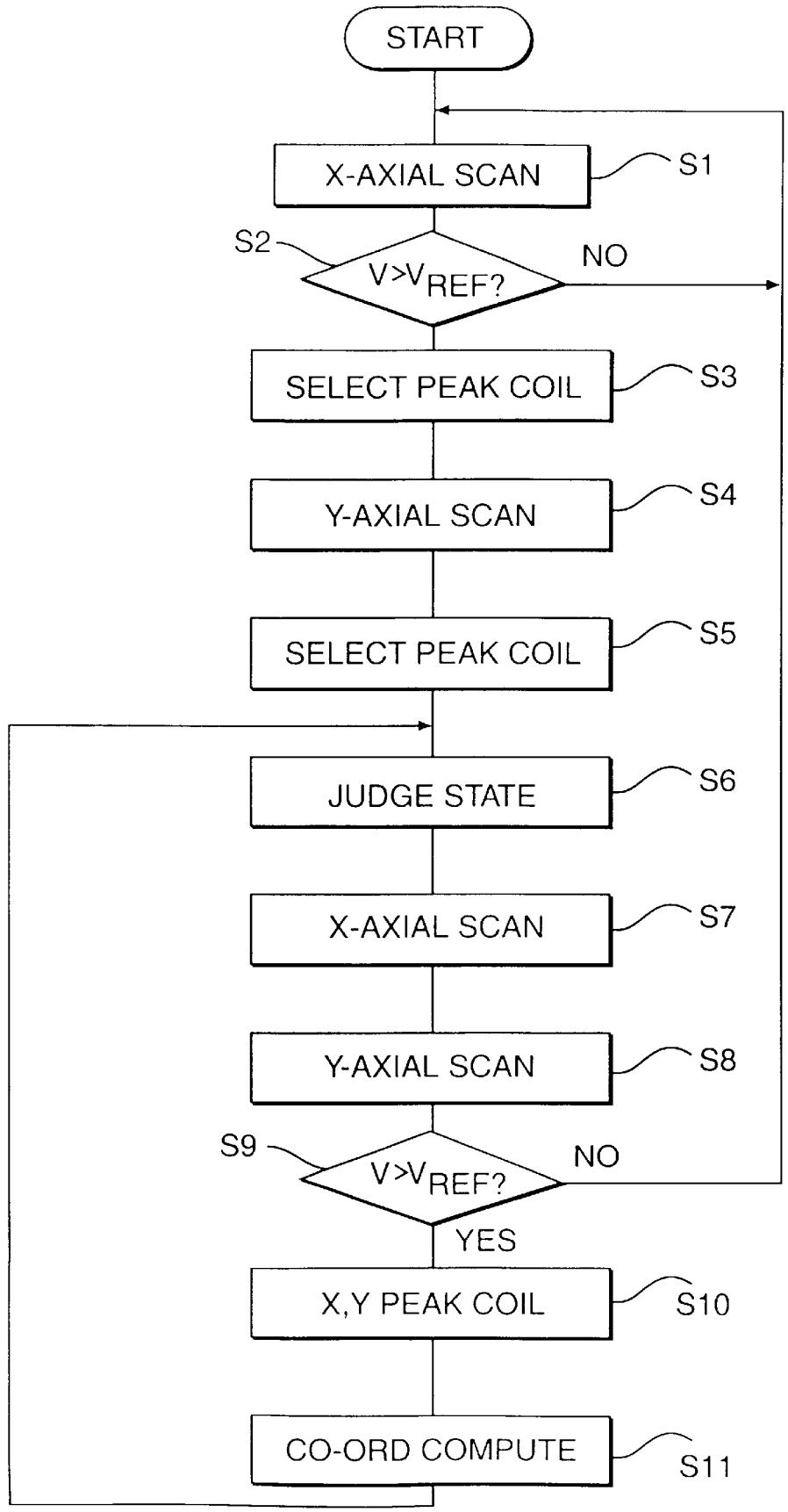
FIG. 7 is a flow chart of a process of a processing device of the first embodiment.

FIG. 7 is a flow diagram for the operation of the processing device 31. First, the processing device 31 sends out an information signal to the selection circuit 22 to select the first loop coil, e.g. X1, from the X-axial loop coil group 21a. At the same time, the processing device 31 sends a signal to the transmit/receive select circuit 25 to select transmission, thereby generating electromagnetic waves with frequency f0 by supplying a sinusoidal signal with frequency f0 to the loop coil X i from the oscillator 23. At this time, if the position pointing device A is located on the tablet B, then the electromagnetic wave oscillates the resonance circuit 11 and generates induced voltage with frequency f0.

The processing device 31, after sending a signal to the transmit/receive select circuit 25 to select transmission for an established fixed duration, sends a signal to select reception and extinguishes electromagnetic waves generated from loop coil X1. At this time, the induced voltage generated in the resonance circuit 11 of the position pointing device A gradually declines. At the same time, the resonance circuit transmits electro-magnetic waves with frequency f0. Those electro-magnetic waves oscillate the loop coil X1, and induce a voltage therein.

The processing device, after sending a signal to the transmit/receive select circuit 25 to select reception for an established fixed duration, then sends an instruction to the transmit/receive select circuit 22 to select the second loop coil, e.g. X2, of the X-axial loop coil group 21a, and to conduct transmission and reception of electromagnetic waves in the same way as the aforementioned description, followed by the same procedure of sequential scanning from the third to the 40th loop coils, e.g. X3 to X40, of the X-axial loop coil group 21a (step S1).

It is acceptable, instead of selecting every loop coil of the X-axial loop coil group 21a, to select fewer coils such as every other coil, or every third coil. It is also acceptable to transmit and receive electromagnetic waves for a loop coil repeatedly. Furthermore, though the transmitting duration must be the same for each loop coil in each group, and the receiving duration must be the same for each loop coil in each group, the transmitting duration does not have to be the same as the receiving duration.

The induced voltage, i.e., the received signal, generated in the loop coils of the X-axial loop coil group 21a during the receiving duration is detected by detector 27, converted to a direct current signal, smoothed through the low-pass filter 28, held at a fixed timing at S/H circuit 29, and sent out to the processing device 31 as a voltage value via A/D conversion circuit 30.

Figure 8:
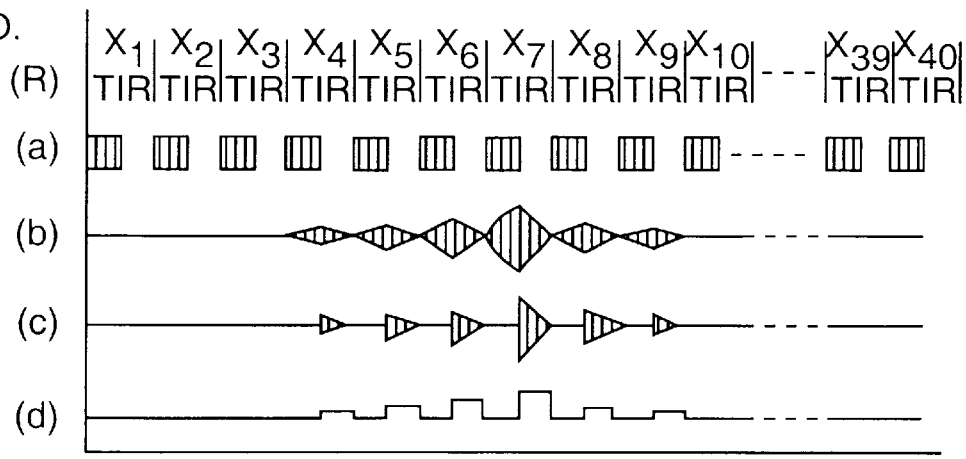
FIG. 8 is a diagram of one example of waveforms obtained at various points during X-axial all surface scanning.

FIG. 8 shows waveforms at various points during the X-axial scanning operation. In the FIG., (a) is electromagnetic waves transmitted from the sensor unit 21, (b) is the induced voltage generated in the resonance circuit 11, (c) is receiving signals, and (d) is output signals of S/H circuit 29.

The output level of S/H circuit 29 is dependent on the distance between the position pointing device A and the loop coil, so that the processing device 31 identifies whether the position pointing device A is within an effective readable height of tablet B or not by examining if the maximum value of the output level is above the predetermined value or not (step S2).

When the processing device 31 identifies that the position pointing device A is within the effective readable height, it selects a loop coil among the X-axial loop coil group which has the maximum value among said attained output signal of each loop coil (defined as the "peak coil") and memorizes the coil number, i this case X7 (step S3). If the position pointing device A is identified as not being within the effective readable height, steps S1 and S2 are repeated.

Figure 9:
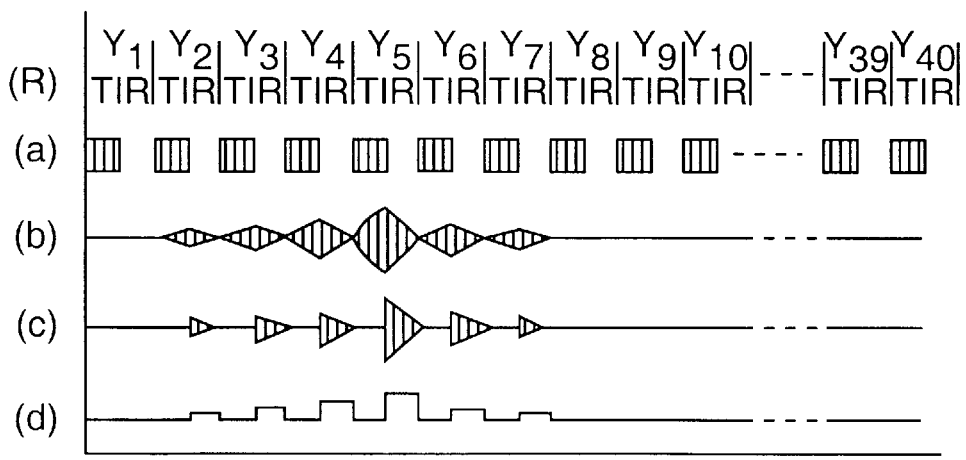
FIG. 9 is a diagram of one example of waveforms obtained at various points during Y-axial all surface scanning.

Next, the processing device 31 conducts sequential scanning and selection for each coil of the Y-axial loop coil group (step S4) and in the same way extracts the peak coil in Y-axial direction and memorizes the coil number, in this case Y5 (step S5). FIG. 9 shows typical waveforms of various points in the circuit during the Y-axial scanning operation, the signals corresponding to those of FIG. 8.

Having identified the maximum value coils, the processing device 31 sends out information to selector circuit 22 to select one of those peak coils X7 (or Y5), and also causes the transmit/receive selector circuit to select transmission for the long duration T1, thus causing the resonance circuit 11 of the position pointing device A to generate an induced voltage with frequency f0. The device 31 then causes the transmit/receive selector circuit 25 to select reception for a fixed duration while there is a voltage induced in the peak coil. Next, the processing device 31 instructs the transmit/receive selector circuit 25 to select the transmission for the shorter duration T2 to induce a voltage in the resonance circuit 25 with frequency f0. Then, the processing device 31 instructs the transmit/receive selector circuit 25 to select reception while there is a voltage induced in the peak coil.

The processing device 31 compares levels of the received signals at the end of the intervals T1 and T2 to determine the ON-OFF state of the switch 15 (step S6).

Next, the processing device 31 conducts transmitting and receiving of electromagnetic waves with a fixed number of loop coils, for example five loop coils, centered on the peak coil of the X-axial loop coil group. During transmission, the peak coil (in this case coil number X7) is always selected, but for reception the coils are selected sequentially (step S7—see the upper line of FIG. 10).

When the X-axial sector scanning operation is over, the processing device 31 conducts transmission and reception of electromagnetic waves with a fixed number of loop coils, for example five, centered on the peak coil of the Y-axial loop coil group in the same way (step S8).

Figure 10:
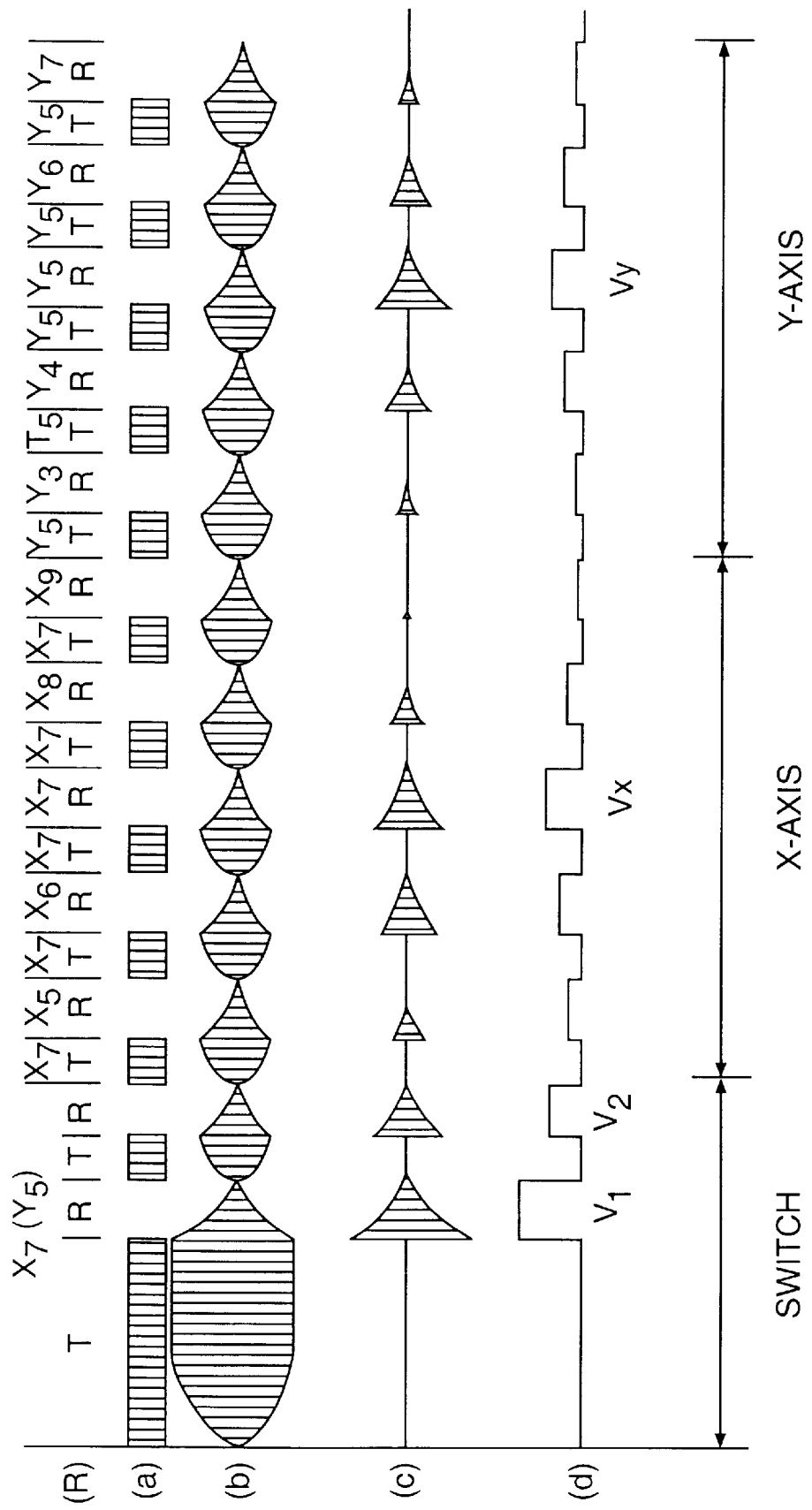
FIG. 10 is a diagram of one example of waveforms, when the switch is OFF, obtained at various points during X-axial and Y-axial sector scanning, whereby judging the state of the switch.
Figure 11:
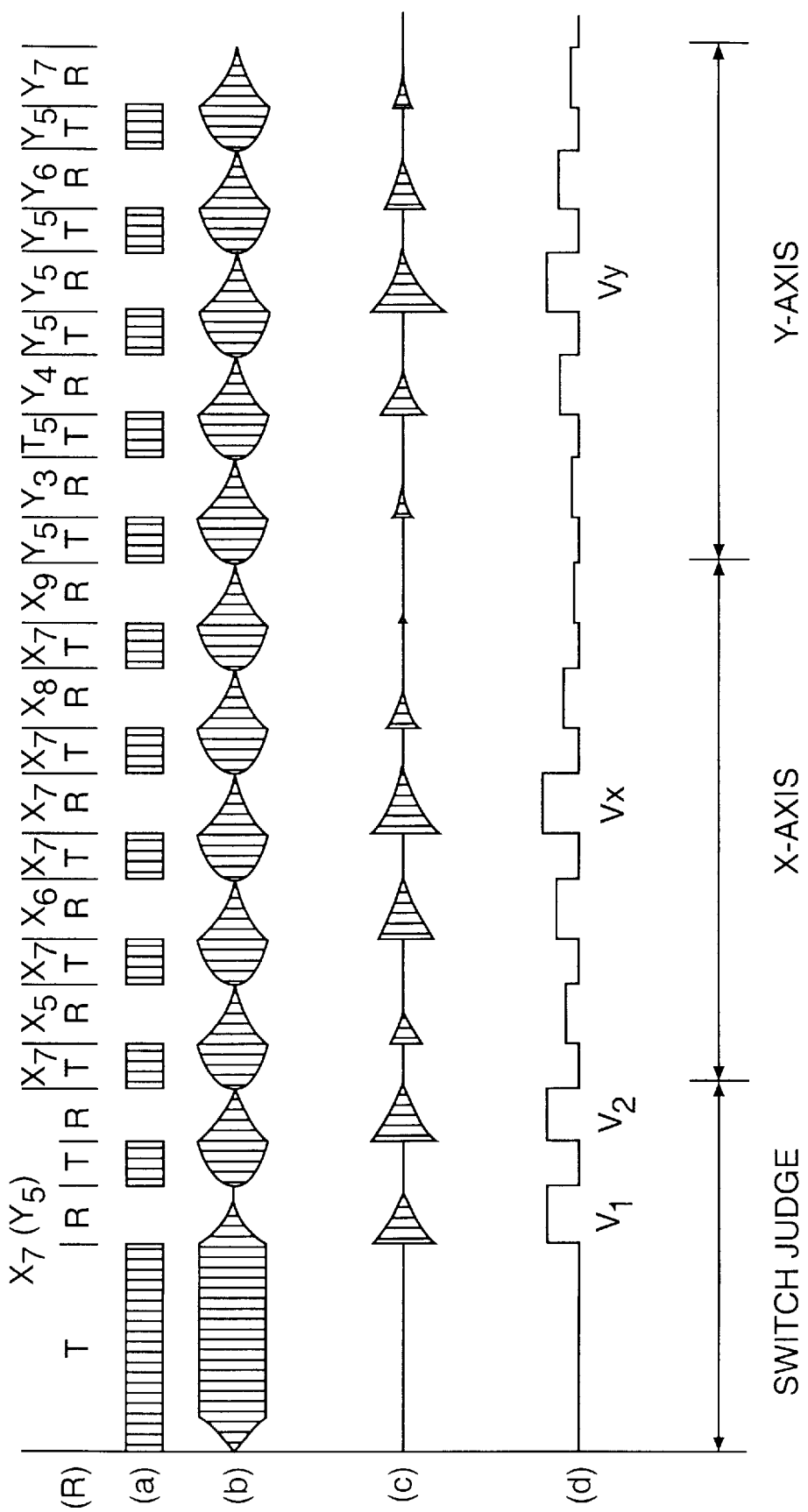
FIG. 11 is a diagram of one example of a waveform, when the switch is ON, obtained at various points during X-axial and Y-axial sector scanning, whereby judging the state of the switch.

FIG. 10 illustrates waveforms at various positions during X-axial and Y-axial sector scanning when the switch 15 is OFF, and FIG. 11 when the switch is ON.

After sector scanning the X-axis and the Y-axis, the processing device 31 again checks whether the attained maximum value of the induced voltage is above the predetermined value or not, thereby checking whether the position pointing device is within the effective readable height above the table B or not (step S9), and if the position pointing device is within said height, then again it extracts the peak coils of both X-axial and Y-axial directions from which maximum induced voltage is attached and memorizes them (step S10). Furthermore, for each X-axial and Y-axial direction sector scanning, it extracts plural induced voltages, for example three each, in decreasing order, and conducts well known coordinate value computing based on these signals as explained in the prior application, thereby finding a coordinate value of a pointed position by position pointing device A for both X-axial and Y-axial directions (step S11).

As long as the position device A is within the readable height, steps S6 to S11 are repeated, but when the position pointing device A is identified as not being within the readable height, the process returns to step S1.

The reason for using only the peak coils for transmission of electromagnetic waves for the operation of the X-axial and Y-axial direction sector scannings is to keep the voltage induced in the resonance circuit 11 each time the electromagnetic wave is transmitted almost constant and thereby excluding the influence of diode 16 in the position pointing device A, and to detect exactly the coordinate value of the pointed position as described in the prior application.

In this way the same intensity signals are generated in the resonance circuit 11 so that the signal intensity of the reflected electromagnetic waves based on the signal received by the loop coils become dependent on the distance between the resonance circuit 11 and a loop coil, thereby making it the largest when the loop coil closest to the resonance circuit is selected. Therefore, in the same manner as the prior application, by identifying the peak coil and using the intensity of the received signals of the loop coils on either side of the peak coil, the exact coordinate value can be found by interpolation.

In the presently described example, a diode with a constant forward voltage is used. It is acceptable to use other elements which have the same characteristics (e.g. transistor, Zener diode, FET, etc.)

The addition of the diode and switch does not influence the resonance frequency of the resonance circuit, thereby simplifying the configuration of the position pointing device and the adjustment of the resonance frequency. A wide frequency range is not required because only the changing level of just one frequency needs to be detected. Moreover, no hardware configuration to detect the change of phase angle is needed to identify the switch state of the position pointing device.

Figure 12:
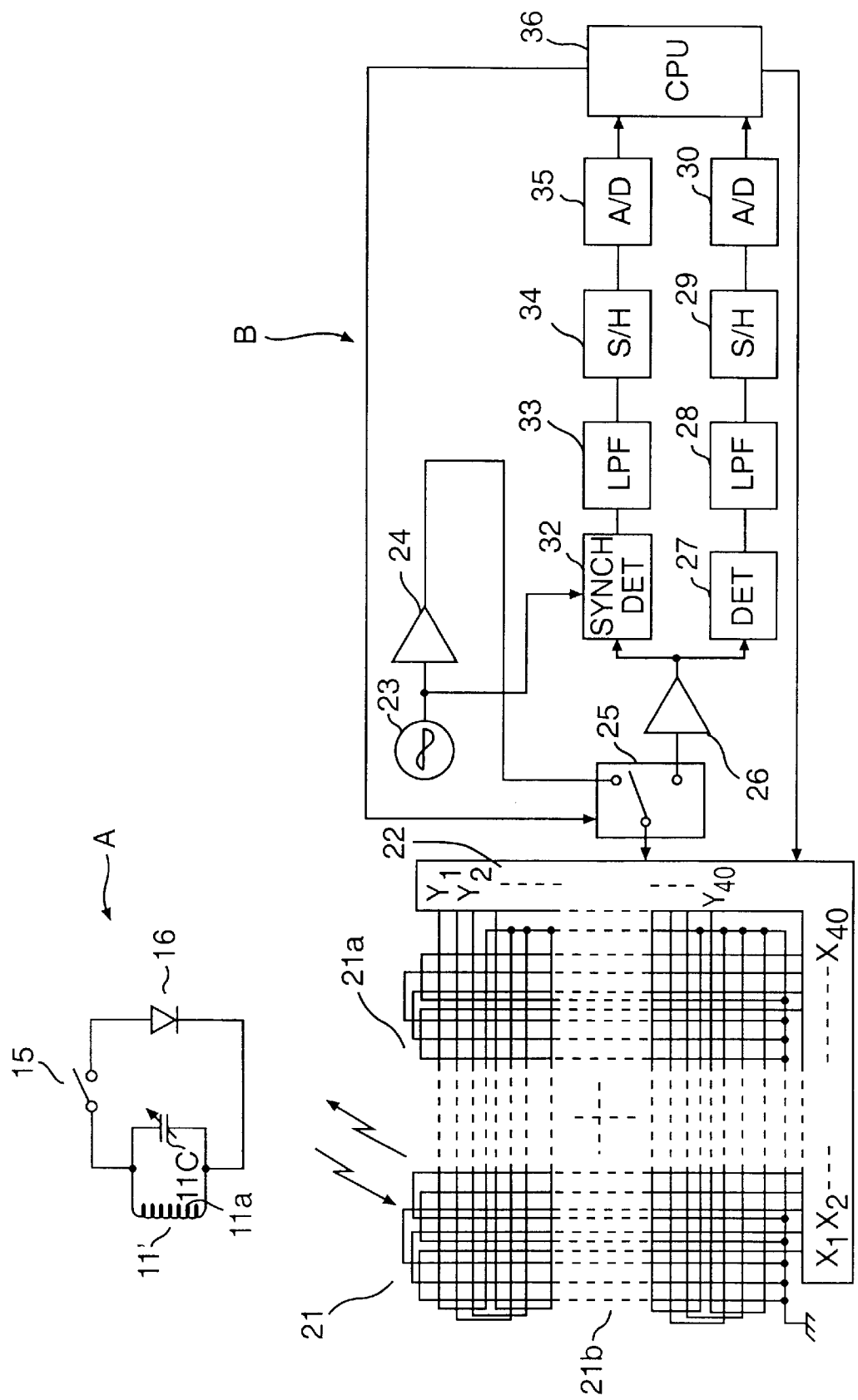
FIG. 12 is a diagram of a second embodiment of the position detecting apparatus and the position pointing device.

FIG. 12 illustrates a second embodiment of the present invention, in which both switch information and pen pressure information are available using a variable capacity capacitor 11c, synchronous detector 32, a low-pass filter 33, a sample hold (S/H) circuit 34, an analog to digital (A/D) conversion circuit 35, and a processing device 36.

The variable capacity capacitor is a type which changes the capacity value in accordance with the pen pressure applied to the position pointing device, which is connected to the coil 11a in series to form the resonance circuit 11'. Here, the resonance circuit 11' is set with a frequency to be detected as frequency f0 and phase angle 60 degrees at the state of no pen pressure at all, and for pen pressures increasing to, for example, 500 g, the phase angle continuously changes to −60 degrees.

The synchronous detector 32 generates a signal with a level corresponding to a phase difference of the output signal of the receiving amplifier 26 and the alternating current signal from the oscillator 23, and sends the signal to the low-pass filter 33 which possesses a cut-off frequency sufficiently below frequency f0 and which converts the output signal of synchronous detector 32 to a direct current signal. This signal is sent on to the S/H circuit 34 which holds the voltage value of the output signal from the low-pass filter 33 at the fixed timing, and sends it on via the A/D conversion circuit 35 to the processing device 36.

The processing device 36 controls various portions of the table B, computing coordinate values of the position pointing device A based on the levels of the induced voltage attained from the X-axial loop coil group 21a and the Y-axial loop coil group 21b when the electromagnetic waves are transmitted for a fixed transmitting duration. It also identifies whether the switch 15 of the position pointing device 15 was turned ON or not based on the change of the induced voltage levels attained from the X-axial loop coil group 21a and the Y-axial loop coil group 21b when the electromagnetic waves are transmitted for two different periods as well as detecting the pen pressure on the signal levels corresponding to the phase angle differences.

Figure 13:
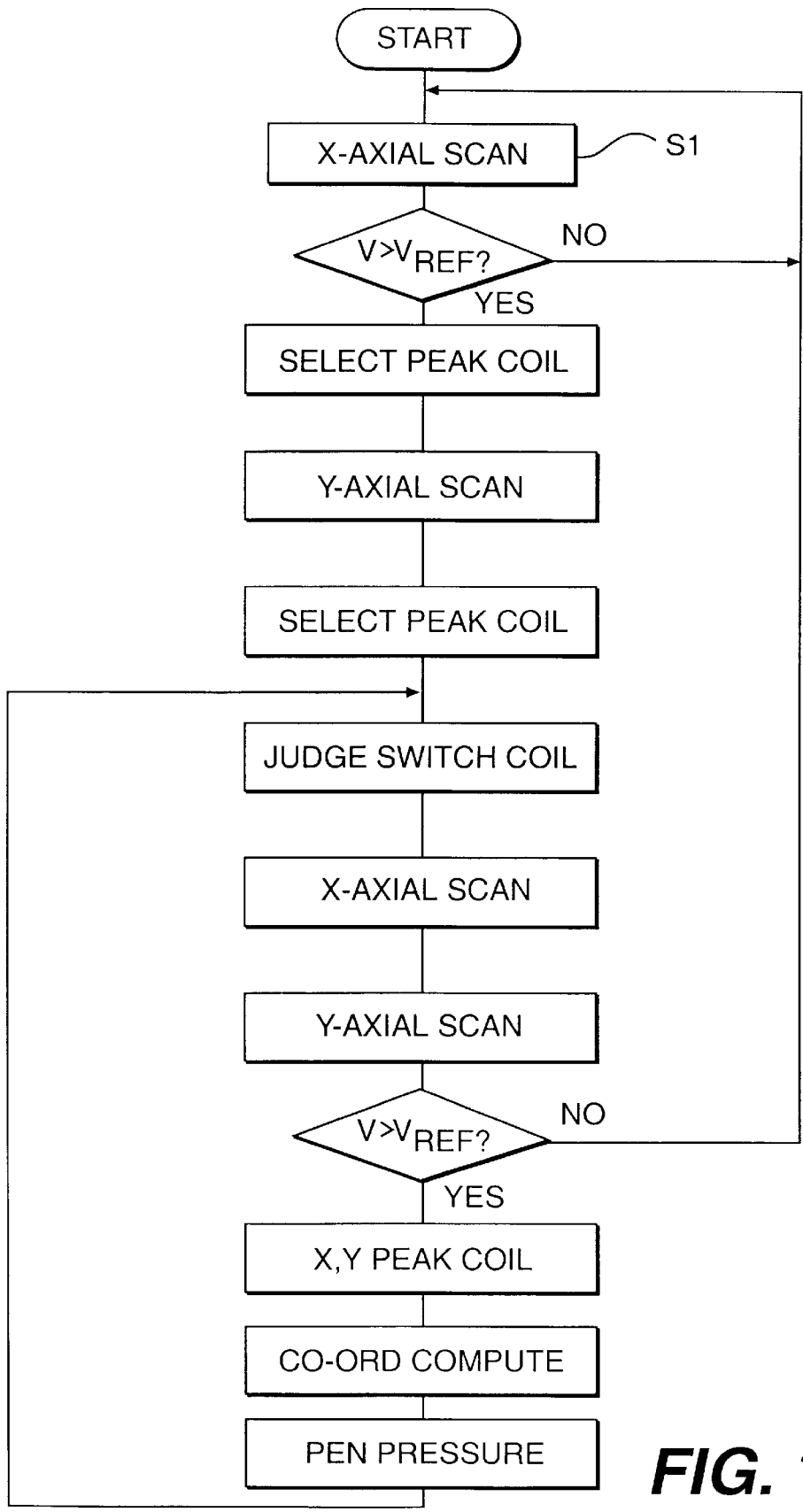
FIG. 13 is a flow chart of a process of a processing device of the second embodiment.

FIG. 13 is a flow diagram of the processing device 36, which is the same as FIG. 7 for the first embodiment, except that pen pressure is determined from signal levels corresponding to the phase angle differences after computing the coordinate values. The level change of both transmitting signal and receiving signal is the same as in the first embodiment.

As in the first embodiment the addition of the diode and switch does not influence the resonance frequency of the resonance circuit, thereby simplifying the configuration of the position pointing device and the adjustment of the resonance frequency. A wide frequency range is not required because only the changing level of just one frequency needs to be detected. Moreover, no hardware configuration to detect the change of phase angle is needed to identify the switch state of the position pointing device, and also, in this embodiment, to detect the pen pressure simultaneously.

Figure 14:
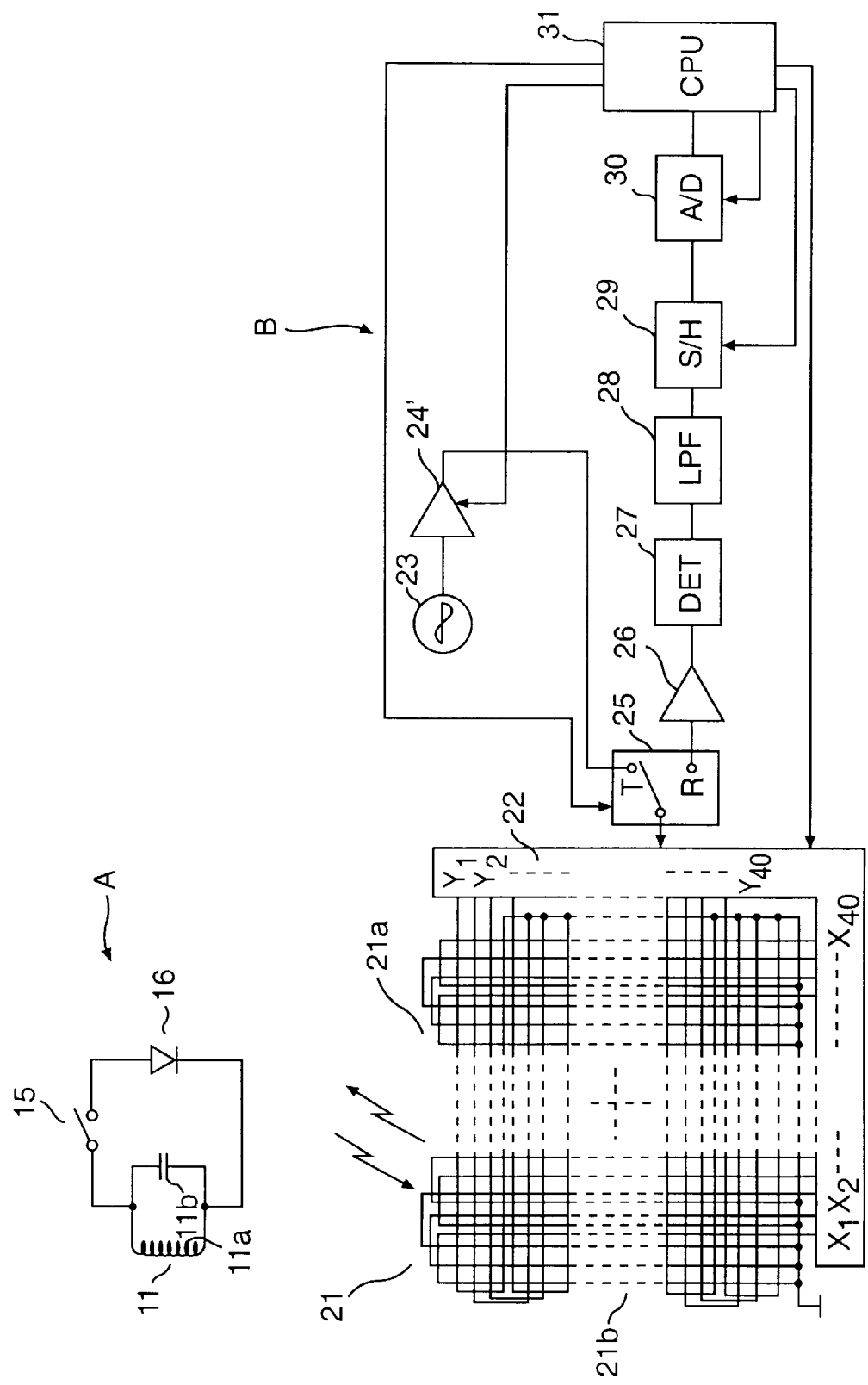
FIG. 14 is a diagram illustrative of a third embodiment of the position detecting apparatus and the position pointing device.

FIG. 14 illustrates a third embodiment in which two kinds of transmitting power rather than duration are employed. The current driver 24' is capable of changing the current value flowing through a loop coil by means of the processing device 31. The processing flow is the same as in FIG. 7, and the surface scanning operation is the same as in FIGS. 8 and 9.

Figure 15:
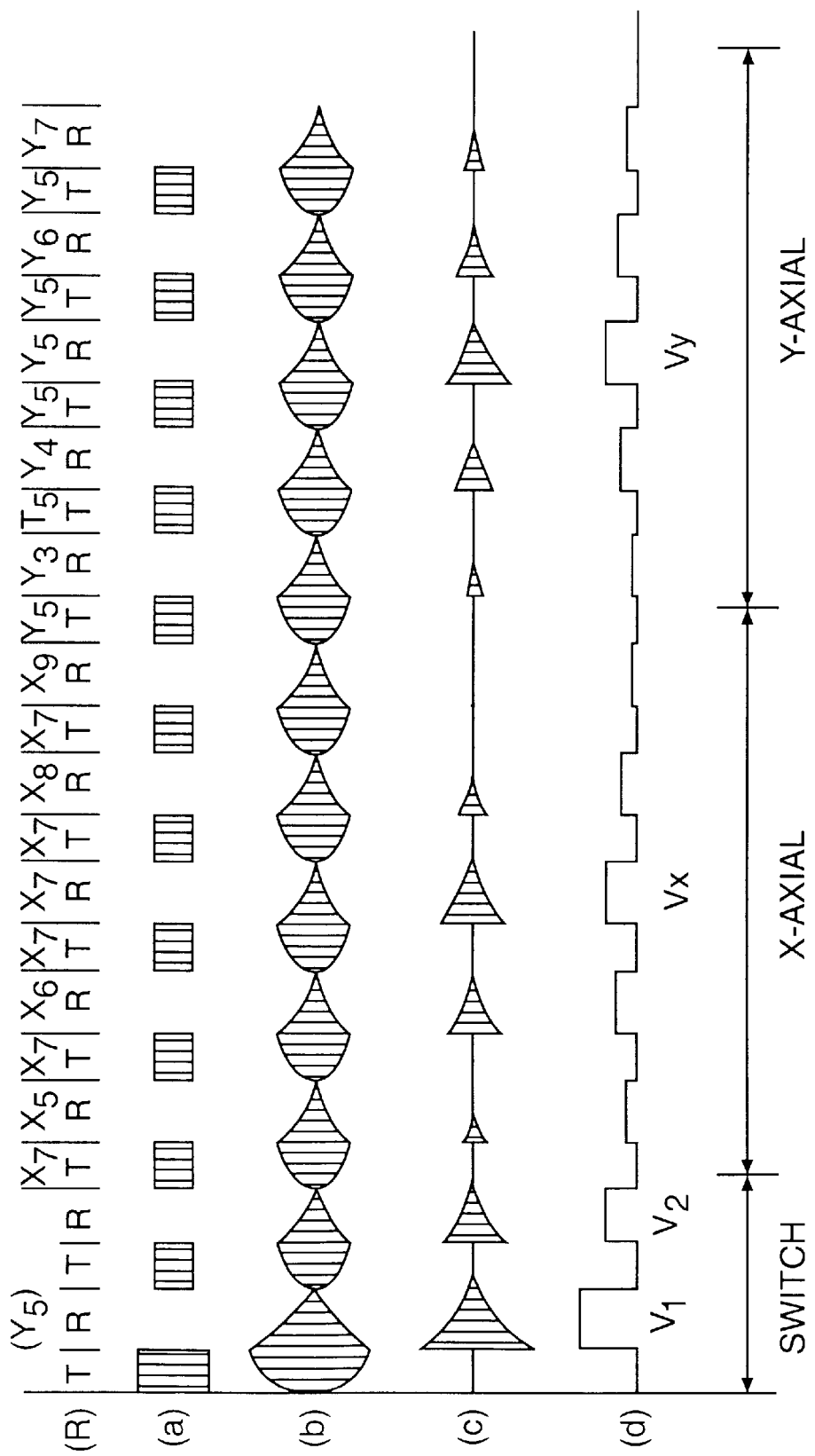
FIG. 15 is a diagram of one example of waveforms, when the switch is OFF, obtained at various portions during X-axial and Y-axial sector scanning, whereby judging the state of the switch.
Figure 16:
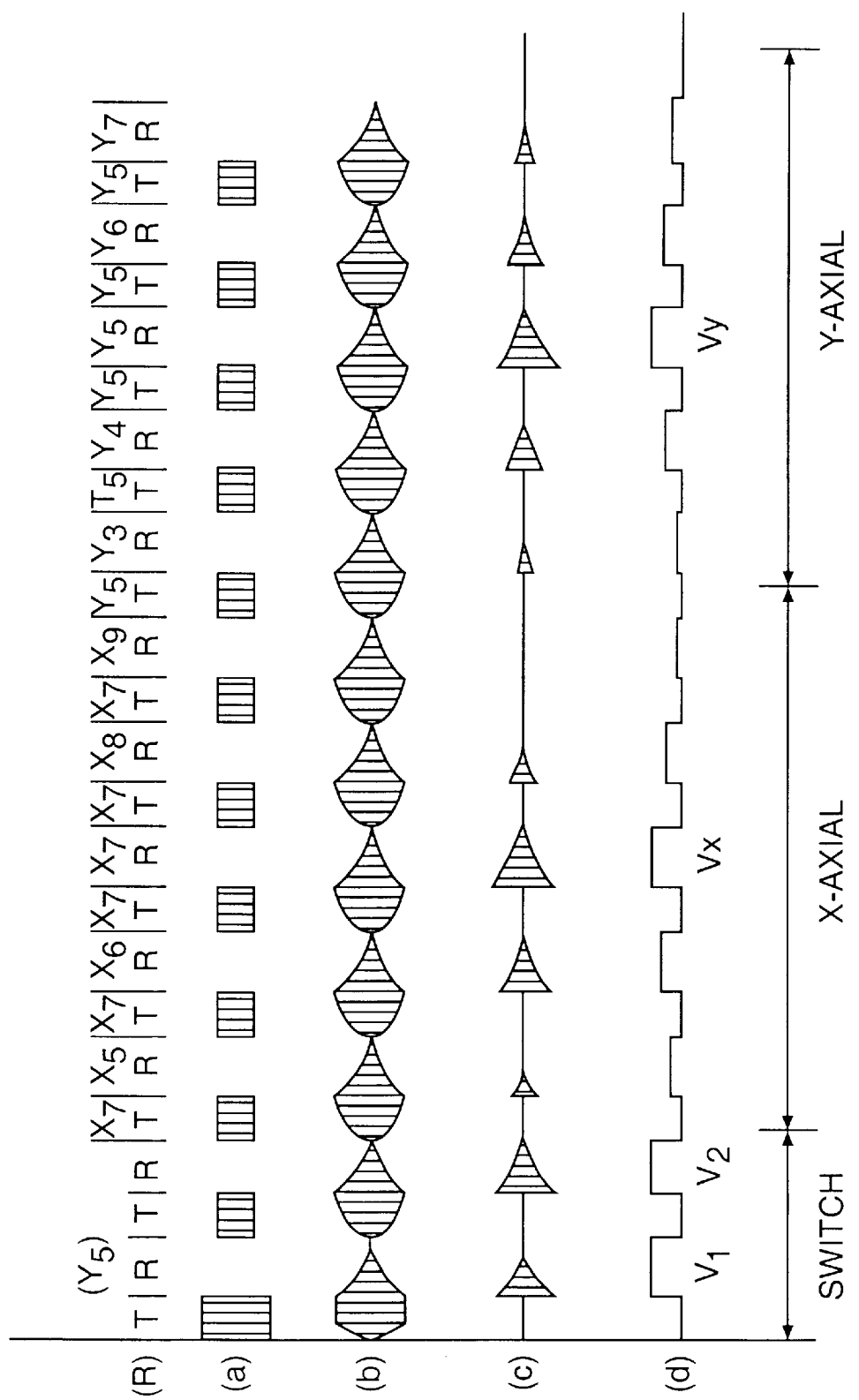
FIG. 16 is a diagram of one example of waveforms, when the switch is ON, obtained at various portions during X-axial and Y-axial sector scanning, whereby judging the state of the switch.

FIGS. 15 and 16 illustrate waveforms at various points when the switch 15 of the position device is OFF and ON respectively for different transmitting powers as can be seen from the second lines in the two figures. Once again the addition of the diode and switch does not influence the resonance frequency of the resonance circuit, thereby simplifying the configuration of the position pointing device and the adjustment of the resonance frequency. A wide frequency range is not required because only the changing level of just one frequency needs to be detected. Moreover, no hardware configuration to detect the change of phase angle is needed to identify the switch state of the position pointing device.

Figure 17:
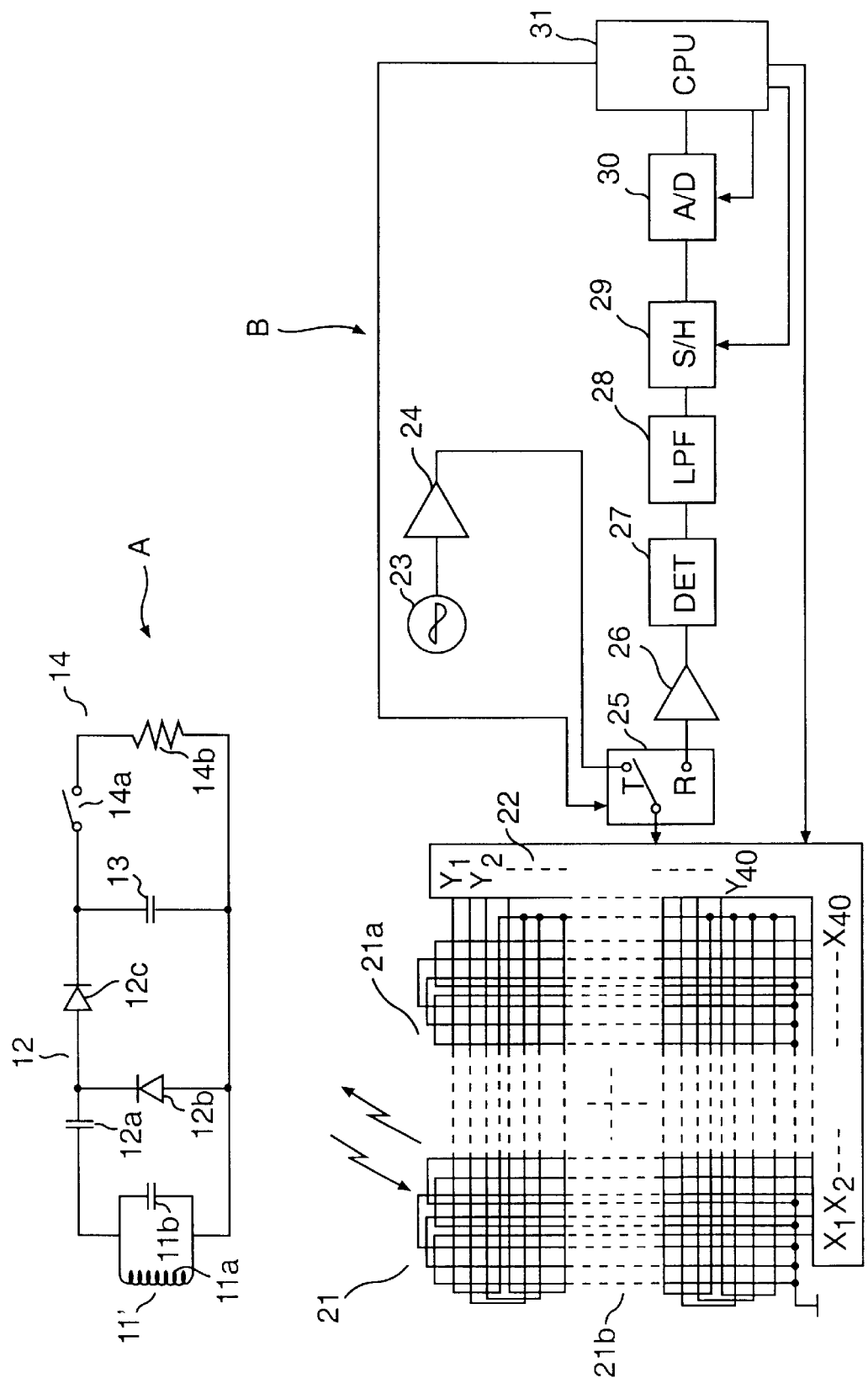
FIG. 17 is a diagram of a fourth embodiment of the position detecting apparatus and the position pointing device.

FIG. 17 illustrates a fourth embodiment, in which position pointing device A employs a coil 11a, a capacitor 11b, capacitor 12a, diodes 12b, 12c, capacitor 13, a switch 14a and resistance 14b. The configuration of the tablet B is the same as in the first embodiment.

The coil 11a and the capacitor 11b are connected in a loop, and make up the known resonance circuit 11 which possesses a fixed resonance frequency f0. The capacitor 12a and diodes 12b and 12c make up the known rectifier circuit 12, which picks up direct current signals from the resonance circuit 11. The capacitor 13 is connected in parallel with the resonance circuit via rectifier circuit 12, which is charged by output signals from the rectifier circuit 12.

A load circuit 14 connected to both ends of the capacitor 13 comprises a switch 14a and a resistor 14b connected in series. The impedance changes between infinite (switch OFF) and a resistance value of the resistor 14b (switch ON).

In this embodiment, the flow diagram of the processing device 31 follows the first embodiment up to step S5 of FIG. 7, but differs from step S6. The processing device 31 instructs the selector circuit 22 to select the peak coil, in this case X7 in the X direction or Y5 in the Y direction, and at the same time transmits a signal to the transmit/receive selector circuit, like the first embodiment, for the long duration T1, thereby inducing a voltage in the resonance circuit 11 of the position pointing device A with the frequency f0. It then instructs the transmit/receive selector circuit 25 to select reception receiving signals caused by the induced voltage. Furthermore, the processing device 31 instructs the transmit/receive selector circuit 25 to select transmission for the shorter duration T2 and induces a voltage in the resonance circuit 25 of the position pointing device A with frequency f0, after which it instructs the transmit/receive selector circuit 25 to select reception of signals caused by the induced voltage.

The processing device 31 compares levels of the signals received after the intervals T1 and T2, thereby identifying the ON-OFF state of the switch 15 (step S6).

Next, the processing device 31 conducts X-axial sector scanning (step S7) centered on the peak coil in the X-axial loop coil group 21a, as well as Y-axial sector scanning (step S8) centered on the peak coil in the Y-axial loop coil group in the same manner as in the first embodiment.

Figure 18:
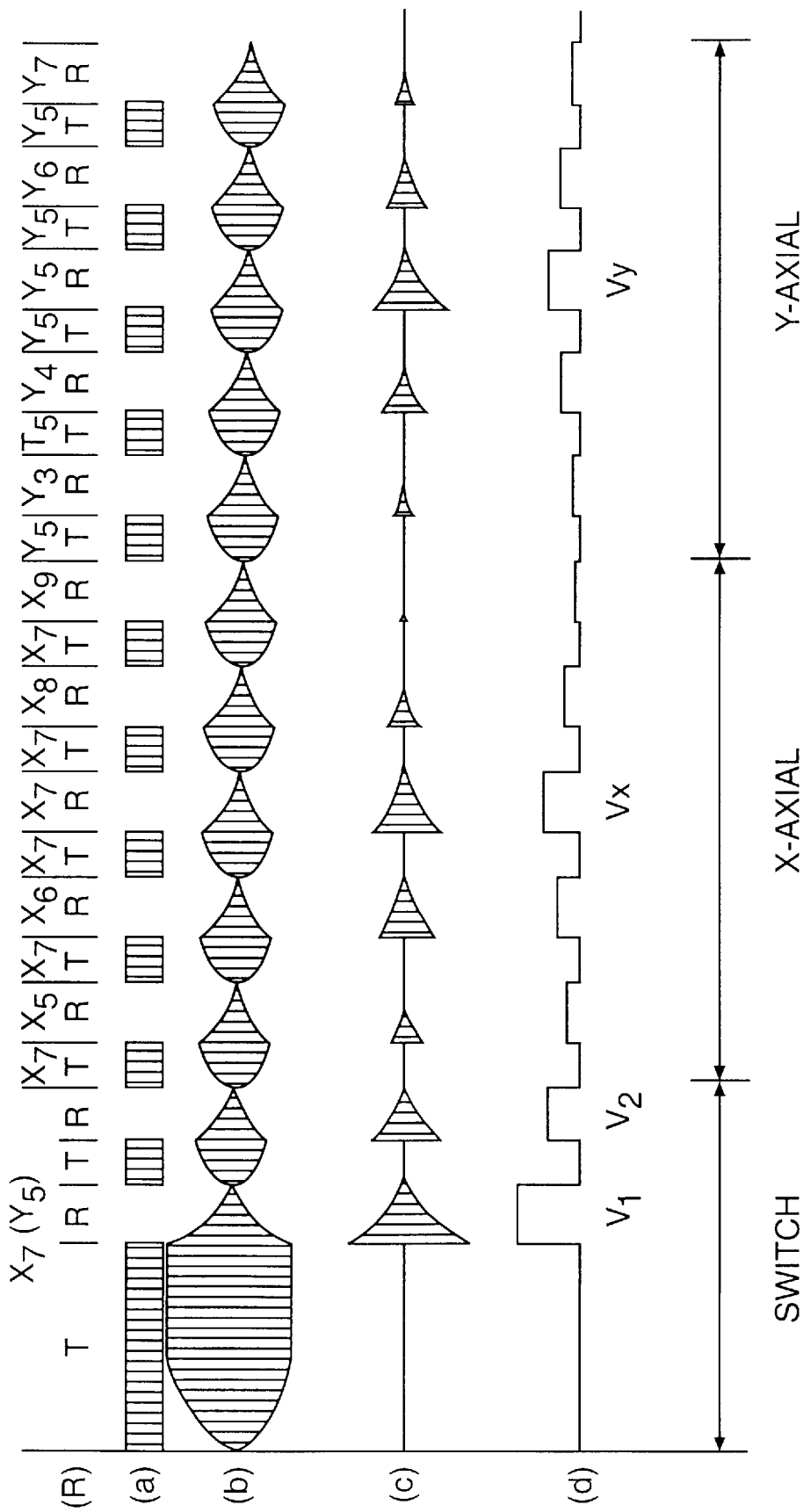
FIG. 18 is a diagram of one example of waveforms, when the switch is OFF, obtained at various portions during X-axial and Y-axial sector scanning, whereby judging the state of the switch.
Figure 19:
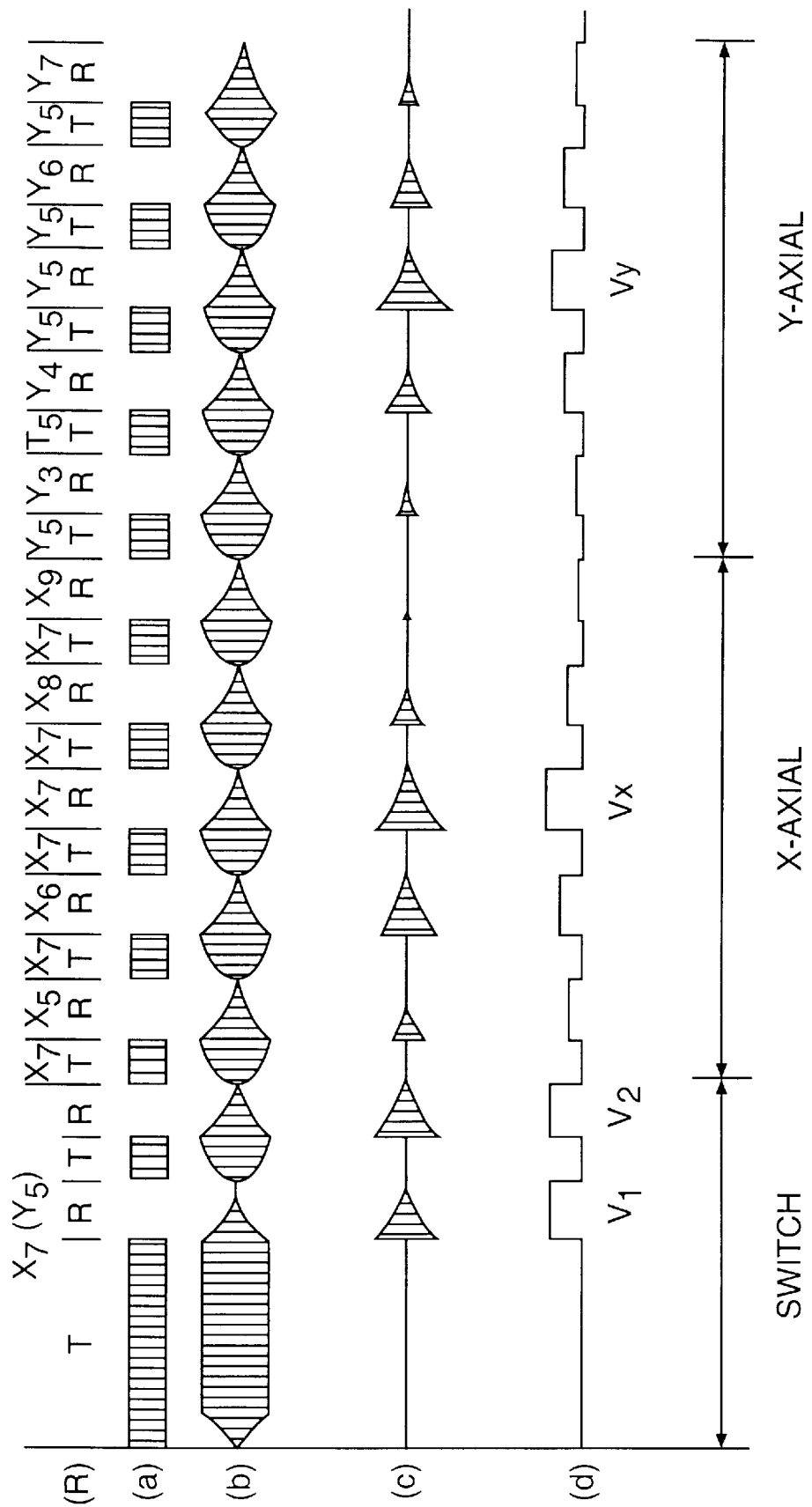
FIG. 19 is a diagram of one example of waveforms, when the switch is ON, obtained at various points during X-axial and Y-axial sector scanning for determining the state of the switch.

FIGS. 18 and 19 illustrate the determination of the switch state when the switch 14a is OFF and ON respectively, in exactly the same manner as the operation in the first embodiment (FIGS. 10 and 11).

After sector scanning the X-axial and the Y-axial directions, the processing device 31 again identifies whether the attained maximum value of the induced voltage is above the established value or not, thereby identifying whether the position pointing device is within the effective readable height above the tablet B or not (step S9). If the position pointing device is within the readable height, the processing device 31 then extracts the peak coils of both X-axial and Y-axial directions from which maximum induced voltage is attained and memorizes them (step S10); furthermore, for each of X-axial and Y-axial direction sector scanning, it extracts plural induced voltages, for example three each, in decreasing order, and conducts well known coordinate value computing based on these signals as explained in the prior application, thereby finding a coordinate value of pointed position by position pointing device A for both X-axial and Y-axial directions (step S11). These steps from S9 to S11 are also exactly the same as in the first embodiment.

The principle of the switch state identification is illustrated in detail in FIG. 5, FIGS. 20a–20c, FIGS. 21a–21b, and FIGS. 22a–22c.

Figure 20A:
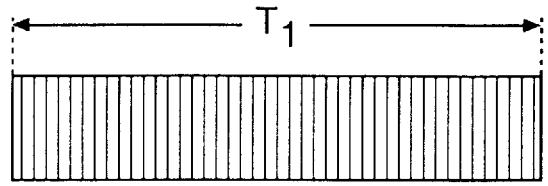
FIGS. 20a–20c are diagrams of waveforms, when a capacitor is not charged, obtained at various points in the position pointing device shown in FIG. 5.
Figure 20B:
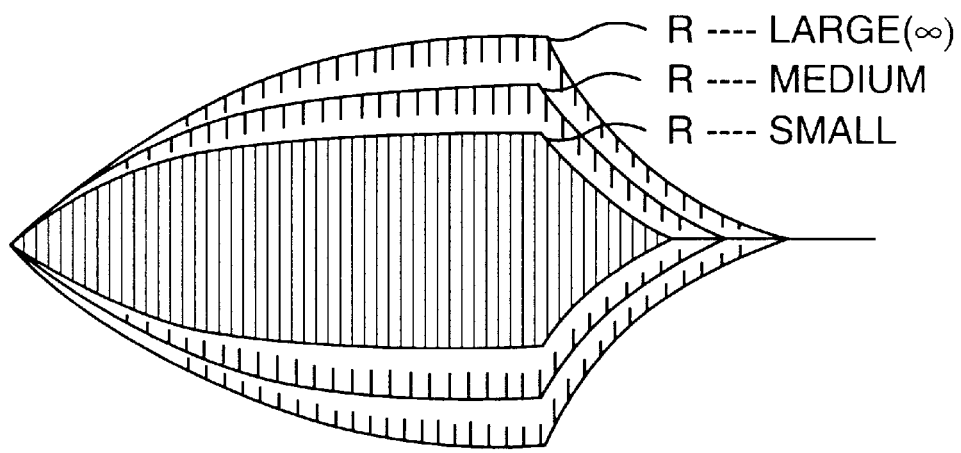
Figure 20C:
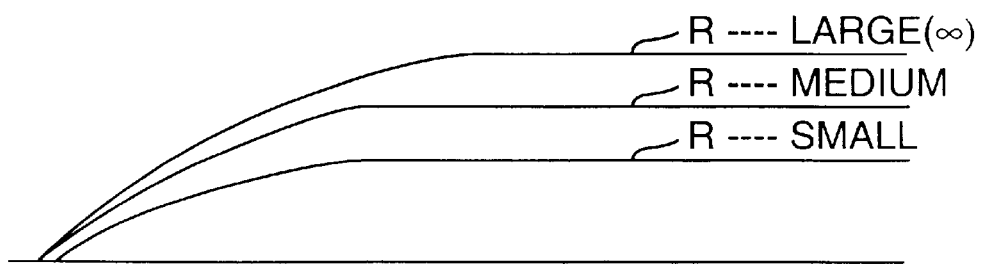

When the position pointing device shown in FIG. 5 receives electromagnetic waves for a fixed duration (T1) as shown in FIG. 20a, the resonance circuit 11 generates a signal with a wave form shown in FIG. 20b and the capacitor 13 generates a signal with a wave form shown in FIG. 20c (this assumes T1 is a duration sufficient for the voltage of resonance circuit 11 is saturated when the load resistance R is infinite). The capacitor 13 becomes saturated after a certain period of electromagnetic wave reception, and its voltage remains constant. This saturated voltage value is dependent on the value of load resistance R, so that it becomes lower as the value of R gets smaller as shown in FIG. 20c. Also, the signal level at both ends of the resonance circuit 11 becomes saturated as shown in FIG. 20b, and the saturation level thereof is dependent on the value of the load resistance R, so that it becomes small as the value of R gets smaller. The reason for this will not be explained.

The saturated voltage value is decided by a balance between the charged electromagnetic power in the capacitor 13 caused by the induced voltage of received electromagnetic waves and the consumed electromagnetic power which flows out from the capacitor 13 to the load resistance R. The voltage value for equal charged electromagnetic power and consumed electromagnetic power is the saturation voltage value.

Figure 21A:
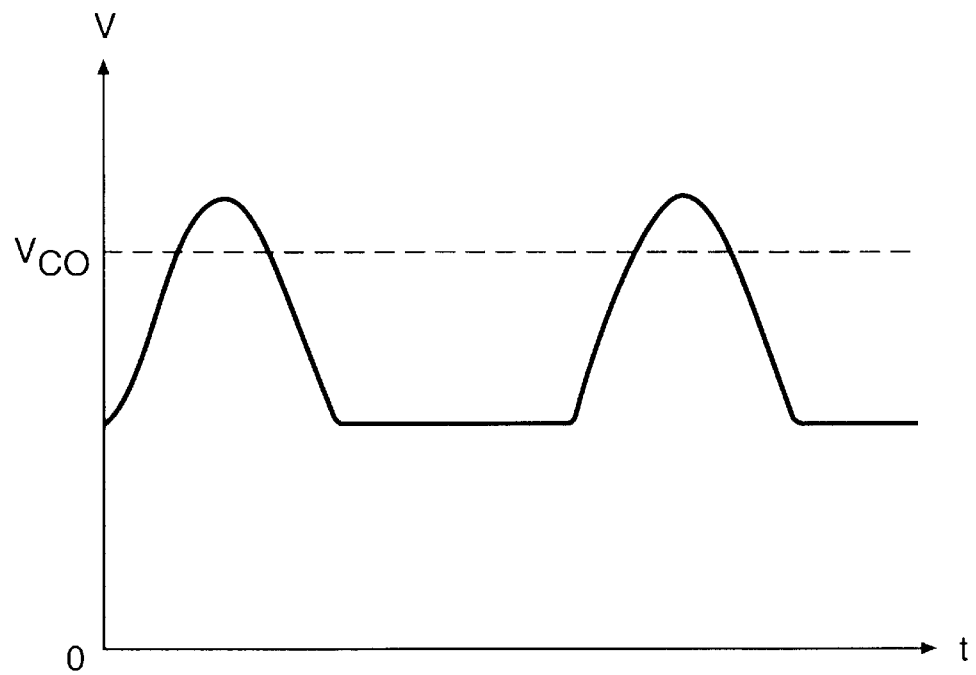
FIGS. 21a and 21b show waveforms obtained at various points in the pointing device shown in FIG. 5, wherein a rectifier circuit and a capacitor are connected or not connected.

In the position pointing device shown in FIG. 5, where the capacitor 13 and the load resistance R are not connected, then the voltage has a waveform like the one shown in FIG. 21a at the output terminal of the rectifier circuit 12. When the capacitor 13 and the load resistance R are connected, the output voltage of the rectifier 12, i.e., the voltage Vc for both ends of the capacitor 13 is clipped around the initial voltage Vco as shown in FIG. 21b, and the voltage for both ends of the resonance circuit 11 is also clipped in a corresponding manner.

Figure 21B:
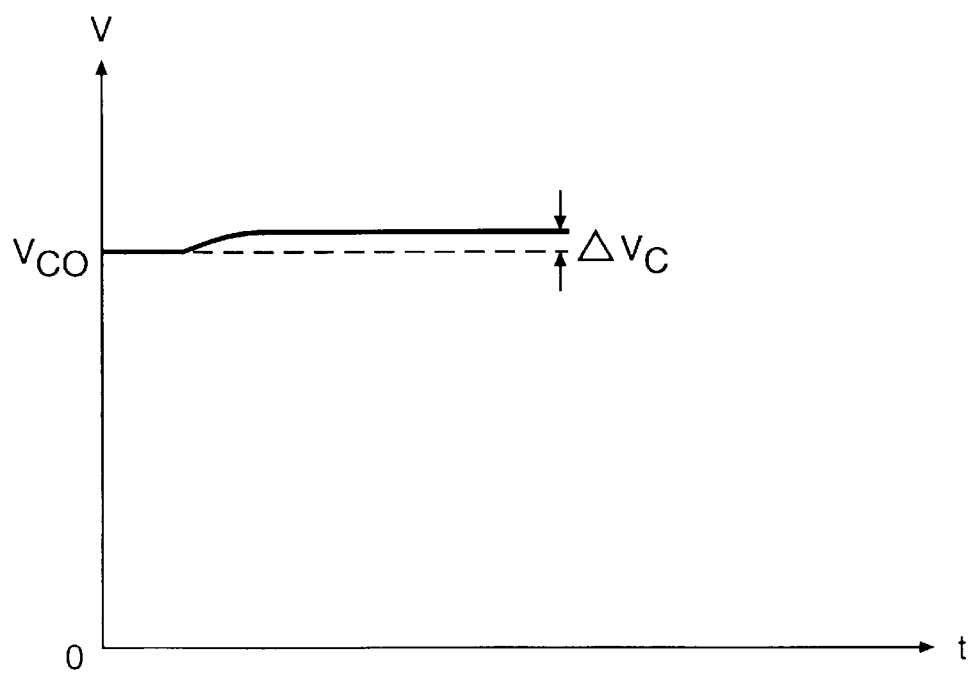

At this time, the voltage Vc of both ends of the capacitor 13 is increased by Delta Vc after one cycle of an electromagnetic wave as shown in FIG. 21b. The amount of increase per cycle gets smaller as the terminal voltage of the capacitor 13 gets higher, so that when the electromagnetic waves are continuously received, the terminal voltage of the capacitor 13 gradually increases and approaches a fixed voltage (saturation voltage). In FIG. 21b if the initial voltage Vco is the same, the amount of voltage increase Delta Vc becomes smaller as the load resistance R gets smaller, so that the saturation voltage becomes lower as the value of the load resistance R becomes smaller.

Figure 22A:
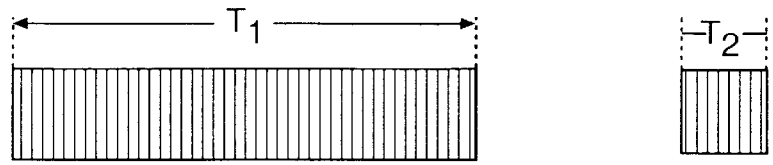
FIGS. 22a–22c show waveforms, when a capacitor is sufficiently charged, obtained at various points in the position pointing device shown in FIG. 5.

The situation when the capacitor 13 is already sufficiently charged, and the terminal voltage Vc has already reached a saturation voltage corresponding to the value of the load resistance R, will now be discussed. In FIG. 22a, an electromagnetic wave is transmitted from tablet B for duration T1. Then, after the induced voltage in the resonance circuit 11 has gradually diminished, an electromagnetic wave is transmitted for the shorter duration T2.

Figure 22B:
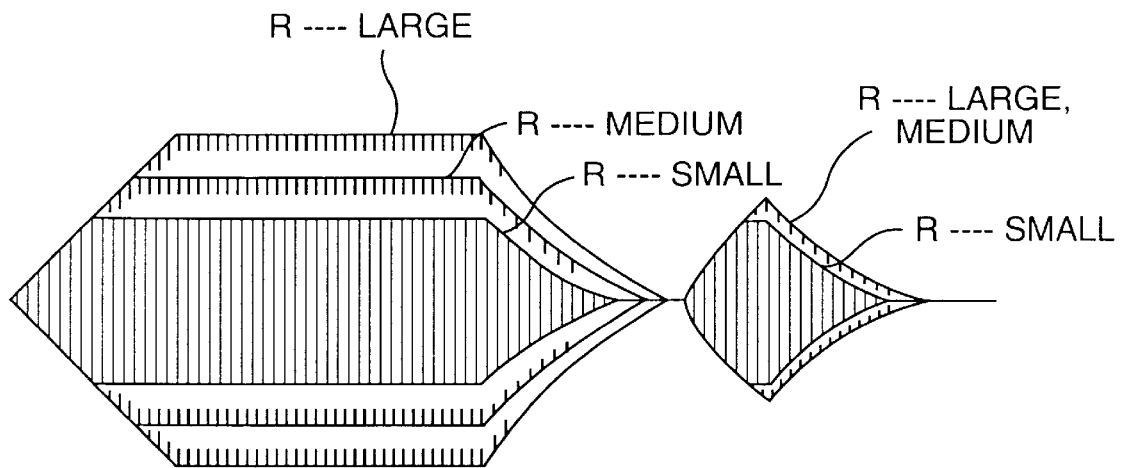
Figure 22C:
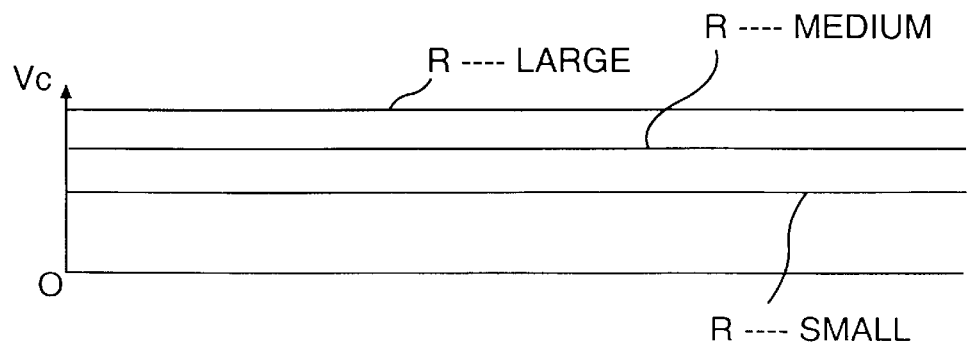

When an electromagnetic wave is transmitted from the tablet B for duration T1, the terminal voltage of the capacitor 13 has already reached the saturation voltage value, as shown in FIG. 22c. The terminal voltage of the resonance circuit 11 rises faster than the case shown in FIG. 20b (terminal voltage of the capacitor starts from zero). However, it gets clipped when it increases to the fixed level (the level output voltage of the rectifier circuit 12 reaches the terminal voltage of the capacitor 13). The signal level (saturation level) at this time, as shown in FIG. 22b, becomes smaller as the load resistance R gets smaller.

When an electromagnetic wave is transmitted from the tablet B for duration T2, the voltage at both ends of the resonance circuit rises faster than the case shown in FIG. 21b, but if the value of load resistance R is sufficiently large then the transmission ends before saturation level is reached, so that it reaches a lower signal level compared to the time the electromagnetic wave is transmitted for the duration T1.

On the other hand, if the value of load resistance R is sufficiently small, then the saturation level is reached before duration T2 ends, so that almost the same level signals are generated in the resonance circuit 11 when an electromagnetic wave is transmitted both for duration T1 and for duration T2. Even when the saturation level is not reached when an electromagnetic wave is transmitted, the gap between two signal levels becomes smaller as the value of load resistance R gets smaller.

The signal level in the resonance circuit 11 is reflected in the received signal level of the tablet B, thereby making it possible to detect the value of load resistance R by comparing the detected received signal level after an electromagnetic wave is transmitted for duration T1 and the detected received signal level after an electromagnetic wave is transmitted for duration T2.

In the position pointing device A shown in FIG. 17, the resistance value of the load circuit 14 changes between the value of resistance 14b and infinity, in accordance with the ON or OFF state of the switch 14a, thereby allowing the ON/OFF state of the switch 14a to be detected by comparing the received signal levels V1 and V2.

Once again the addition of the diode and switch does not influence the resonance frequency of the resonance circuit, thereby simplifying the configuration of the position pointing device and the adjustment of the resonance frequency. A wide frequency range is not required because only the changing level of just one frequency needs to be detected. Moreover, no hardware configuration to detect the change of phase angle is needed to identify the switch state of the position pointing device.

Figure 23:
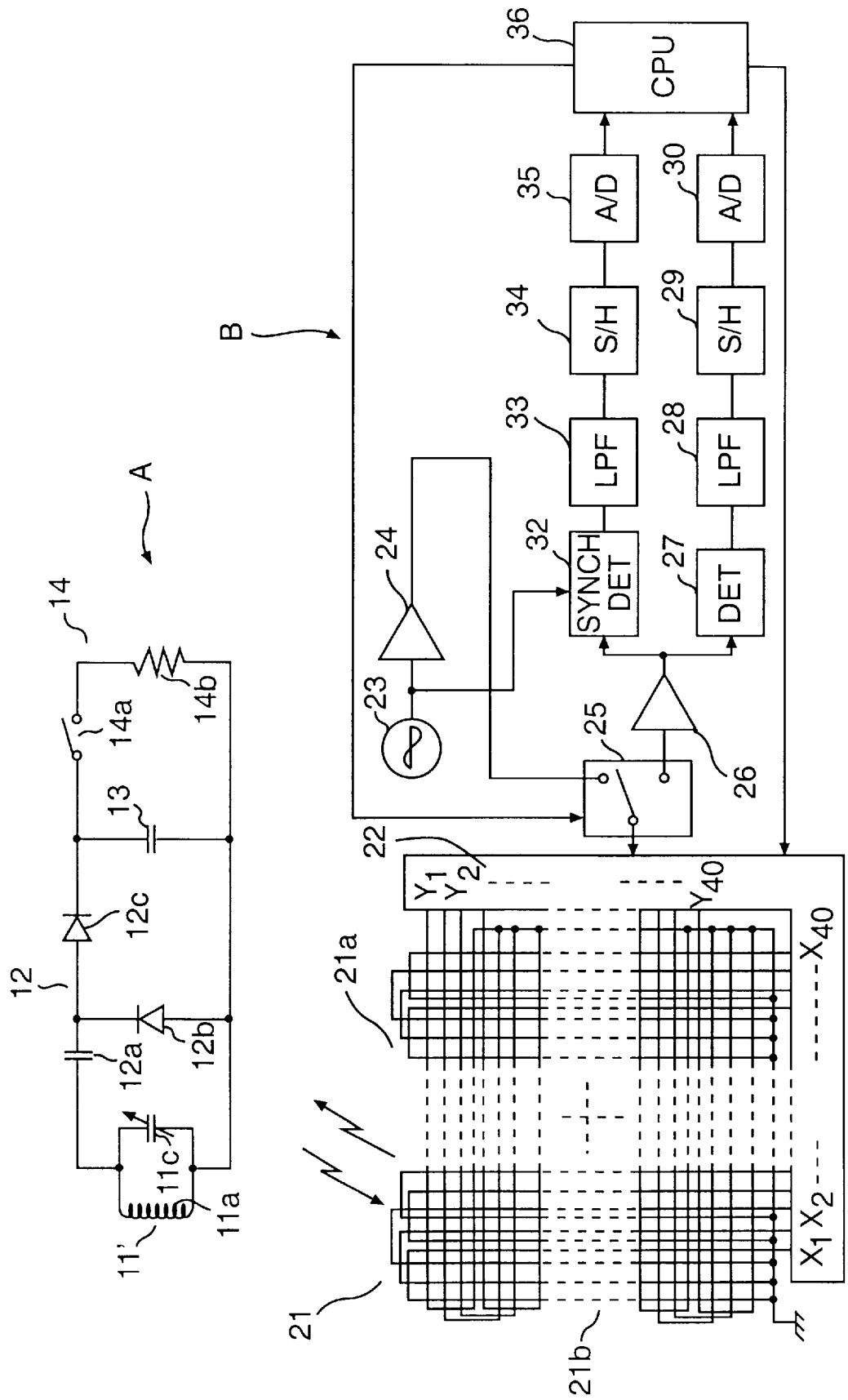
FIG. 23 shows a fifth embodiment of the position detecting apparatus and the position pointing device.

FIG. 23 illustrates a modification of the fourth embodiment in which both switch information and pen pressure information is available. 11c is a variable capacity capacitor; 32 is a synchronous detector; 33 is a low-pass filter; 34 is a sample hold (S/H) circuit; 35 is an analog to digital (A/D)

conversion circuit; and 36 is a processing device. The variable capacity capacitor is a type which changes the capacity value in accordance with the pen pressure applied to the position pointing device, which is connected to the coil 11a in series, and makes up the resonance circuit 11'. Here the resonance circuit 11' is set with a frequency to be detected as frequency f0 and phase angle varying between 60 degrees for zero pen pressure and −60 degrees for a maximum pen pressure of, for example, 500 g.

The configuration of the tablet P in the present embodiment is the same as in the second embodiment. The determination of whether the switch 14a of the position pointing device A is turned ON or not is based on the change in voltage value level of the induced voltage attained from a loop coil in the X-axial loop coil group or the Y-axial loop coil group when electromagnetic waves are transmitted for two kinds of transmitting duration, and furthermore, pen pressure is determined from the signal level corresponding to said difference in the phase angle.

The processing flow of the processing device 36 in the present embodiment is the same as in the second embodiment as shown in FIG. 13.

As in the first embodiment, the addition of the diode and switch does not influence the resonance frequency of the resonance circuit, thereby simplifying the configuration of the position pointing device and the adjustment of the resonance frequency. A wide frequency range is not required because only the changing level of just one frequency needs to be detected. Moreover, no hardware configuration to detect the change of phase angle is needed to identify the switch state of the position pointing device, and also in this embodiment to detect the pen pressure simultaneously.

In the fourth and fifth embodiments, different transmission durations have been employed, but it is acceptable to change transmitting power as in the case of the second embodiment.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

I claim:

1. A position detecting apparatus, comprising a position pointing device and a tablet;

the position pointing device comprising:
a resonance circuit comprising at least a coil and a capacitor; and
an amplitude control circuit for adjustably limiting the maximum amplitude of a signal generated by the resonance circuit according to operation of the amplitude control circuit; and the tablet comprising:
an electromagnetic transmission means for transmitting at least two kinds of energy as electromagnetic waves during one transmission;
an electromagnetic reception means for receiving an electromagnetic wave reflected from said resonance circuit in response to an electromagnetic wave from the electromagnetic transmission means; and
an operation information identification means for identifying an operation by comparing the electromagnetic waves received by the electromagnetic wave reception means as a result of the two kinds of energy in relation to the maximum amplitude.

2. The apparatus as claimed in claim 1, the position pointing device further comprising:
a rectifier circuit for picking up a direct current signal from the resonance circuit, a capacitor for charging by an output signal of the rectifier circuit, and a load circuit connected to both ends of the capacitor wherein an impedance of the load circuit varies in accordance with an operation; and
wherein the operation information identification means detects changes of impedance in the load circuit.

3. Apparatus as claimed in claim 1, the position pointing device further comprising:
a rectifier circuit for picking up a direct current signal from the resonance circuit, a capacitor for charging by an output signal of said rectifier circuit, a load circuit connected to both ends of the capacitor, a switch, and a resistance element connected in series with the switch wherein the switch changes to ON/OFF in accordance with an operation; and
wherein the operation information identification means detects a difference or ratio of intensity of electromagnetic waves received by said electromagnetic wave reception means, and detects changes of impedance in said load circuit.

4. The apparatus as claimed in claim 1, the position pointing device further comprising a diode connected in parallel to the resonance circuit via a switching means; and
wherein the operation information identification means detects a difference or ratio of intensity of electromagnetic waves received by said electromagnetic wave reception means.

5. The apparatus as claimed in any of claims 1–4 wherein the electromagnetic transmission means transmits intermittent electromagnetic waves with at least two kinds of transmission duration.

6. The apparatus as claimed in claim 3 or claim 4 wherein the electromagnetic transmission means transmits intermittent electromagnetic waves with at least two kinds of transmission duration, and wherein the operation information identification means compares the first intensity of the electromagnetic wave received by the electromagnetic reception means to the second intensity of the electromagnetic wave received by the electromagnetic reception means and judges whether the first intensity and the second intensity are almost the same or not.

7. The apparatus as claimed in any of claims 1–4 wherein the electromagnetic transmission means transmits intermittent electromagnetic waves with at least two kinds of transmission power.

8. The apparatus as claimed in claim 3 or claim 4 wherein the electromagnetic transmission means transmits intermittent electromagnetic waves with at least two kinds of transmission power; and wherein the operation information identification means compares the first intensity of the electromagnetic wave received by the electromagnetic reception means to the second intensity of the electromagnetic wave received by the electromagnetic reception means electromagnetic second transmission power, and judges whether the first intensity and the second intensity are almost the same or not.

9. The apparatus as claimed in any one of claims 1, 2, 3, or 4 wherein a resonance frequency of the resonance circuit is configured to change in accordance with pressure, and the tablet further comprises a phase angle difference detecting means for detecting the phase angle difference between the electromagnetic wave transmitted from the electromagnetic transmission means and the electromagnetic wave received by the electromagnetic wave reception means, and pressure information identification means for detecting the pressure from the phase angle difference detected by the phase angle difference detecting means.

10. The apparatus as claimed in claim 1, the position pointing device further comprising:

maximum amplitude setting means for setting the maximum amplitude.

11. The device as claimed in claim 10 further comprising a rectifier circuit to pick up a direct current signal from the resonance circuit; a capacitor charged by an output signal from the rectifier circuit, and a load circuit connected to both ends of the capacitor that changes impedance according to an operation.

12. The device as claimed in claim 11 further comprising a switch and a resistance element in series to the load circuit, wherein the switch turns ON/OFF according to the operation.

13. The device as claimed in claim 10, wherein the resonance circuit is connected to a diode in parallel via a switch turnable ON/OFF according to operation of the switch.

14. A device as claimed in any of claims 10–13, wherein a resonance frequency of the resonance circuit changes in accordance with pressure.

15. The apparatus as claimed in one of claims 2 and 3, the position pointing device further comprising a diode connected in parallel to the resonance circuit via a switching means; and wherein the operation information identification means detects a difference or ratio of intensity of electromagnetic waves received by the electromagnetic wave reception means.

* * * * *